US007013207B2

(12) United States Patent
Majstorovic et al.

(10) Patent No.: US 7,013,207 B2
(45) Date of Patent: Mar. 14, 2006

(54) AUTOMOTIVE PERFORMANCE METER

(75) Inventors: Jovo Majstorovic, Pacific Palisades, CA (US); Maarten A. Rutgers, Los Angeles, CA (US); Daniel S. Smith, Santa Monica, CA (US); Martin Seitzinger, Chicago, IL (US)

(73) Assignee: Tesla Electronics, Inc., Santa Monica, CA (US)

( * ) Notice: Subject to any disclaimer, the term of this patent is extended or adjusted under 35 U.S.C. 154(b) by 0 days.

(21) Appl. No.: 11/148,393

(22) Filed: Jun. 7, 2005

(65) Prior Publication Data

US 2005/0273238 A1    Dec. 8, 2005

Related U.S. Application Data

(62) Division of application No. 10/698,552, filed on Oct. 31, 2003.

(60) Provisional application No. 60/422,596, filed on Oct. 31, 2002.

(51) Int. Cl.
*G06F 7/00* (2006.01)
(52) U.S. Cl. .............................. 701/51; 701/55; 701/64
(58) Field of Classification Search .................. 701/51, 701/55, 64, 62; 477/15, 34
See application file for complete search history.

(56) References Cited

U.S. PATENT DOCUMENTS 4,209,816 A * 6/1980 Hansen .................... 361/23
4,392,098 A * 7/1983 Min ......................... 318/758
2002/0111756 A1   8/2002 Modgil

OTHER PUBLICATIONS

Analog Devices Inc., "Low-Cost ± 10 g Dual-Axis Accelerometer with Duty Cycle," ADXL210E, pp. 1-12, 2002, no month.
J.C. Lötters, et al., "Procedure for In-Use Calibration of Triaxial Accelerometers in Medical Applications," Sensors and Actuators A 68, pp. 221-228, 1998, no month.
John Lawlor, "Brake Horsepower & Torque," Auto Math Handbook, Chapter 4, pp. 23-30, 1991/1992; "Shift Points," Chapter 10, 73-76, 1991/1992, no month.

* cited by examiner

Primary Examiner—Yonel Beaulieu
(74) Attorney, Agent, or Firm—Hogan & Hartson, L.L.P.

(57)   ABSTRACT

Methods, systems and circuits for analyzing the performance of a vehicle having an electrical system are provided which determine a shift point while the vehicle is being driven. The shift point is determined using acceleration data and RPM data generated from the electrical system.

11 Claims, 19 Drawing Sheets

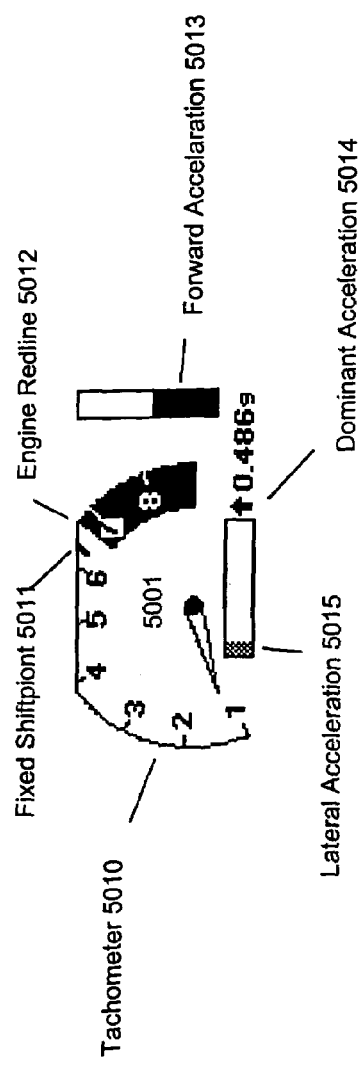
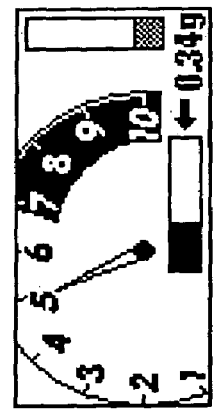
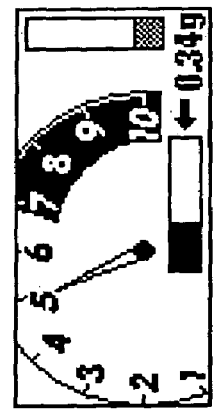
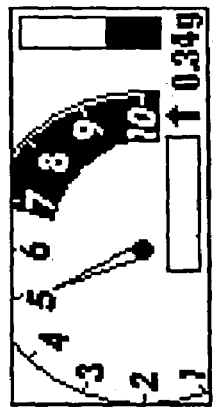
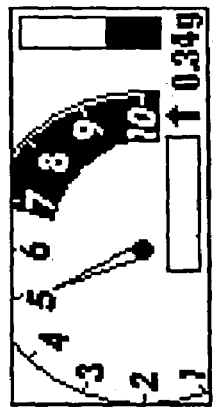
FIG. 5

PRIOR ART FIG. 6

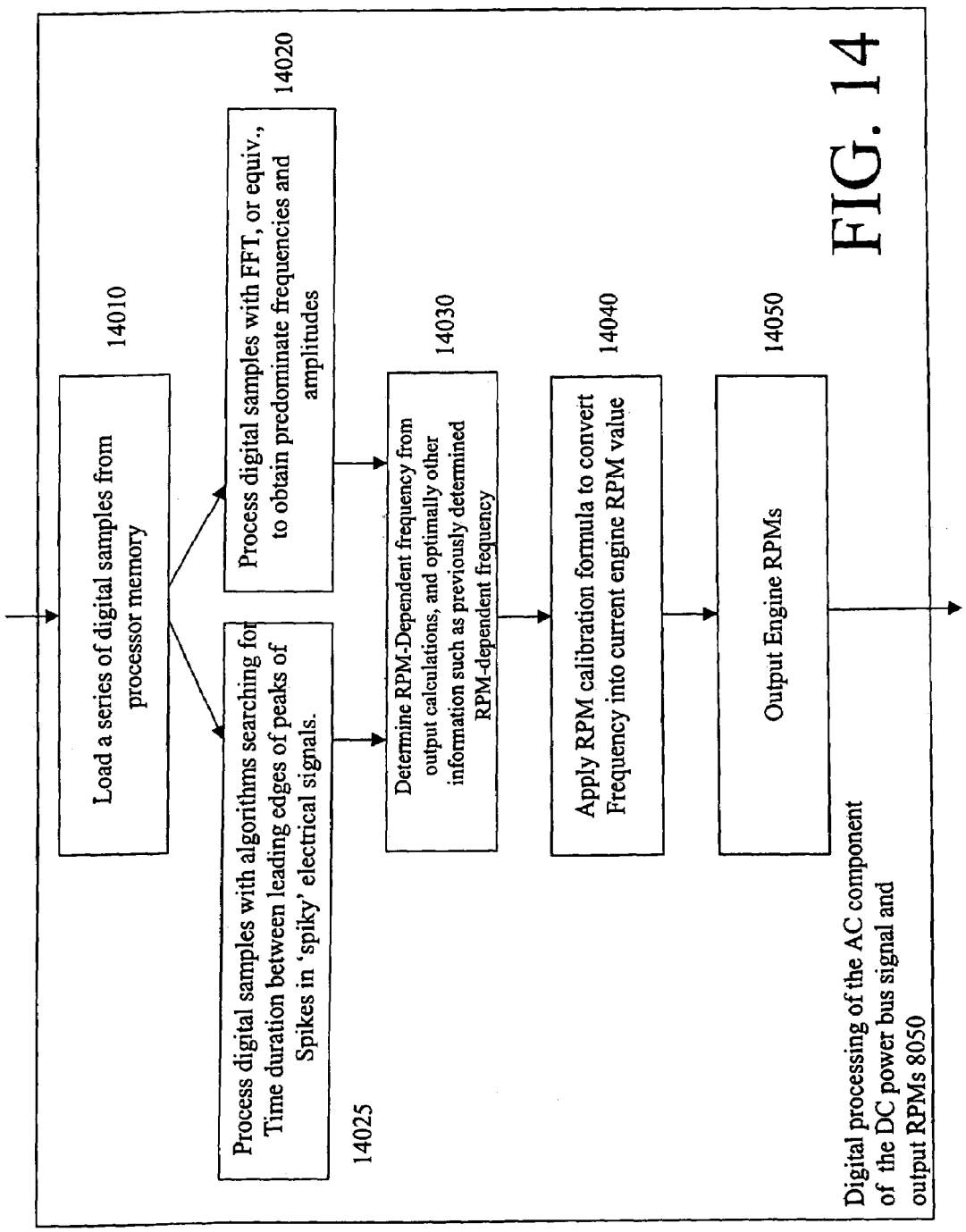

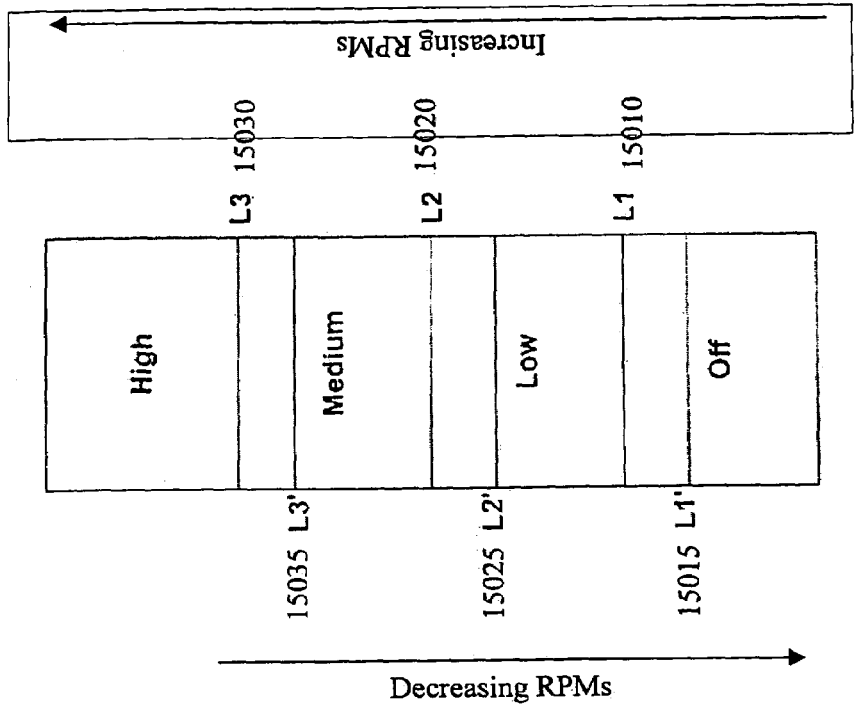

Shiftlight Behavior

As RPMs increase, the shiftlights are affected.

When RPMs first exceed level L1, they transition from OFF to a LOW level. Once the LOW level is attained, the shiftlights will remain on, even if the RPMs drop a bit. Shiftlights will remain on LOW until the RPM level drops below level L1', which is lower than L1. This is to help with hysteresis and fluctuations in RPM levels.

Similarly, the shiftlights will transition to MEDIUM intensity when the RPM level first exceeds level L2, but they will not change back to LOW intensity until the RPM level drops below level L2'.

Any number of shiftlight levels is possible, along with the RPM range that they represent.

Similarly, the shiftlight ranges need not be equally spaced, i.e. the RPM range for LOW might be larger than the RPM range for MEDIUM.

Also, the RPM range between L3 and L3' need not be the same as the RPM range between L2 and L2', etc...

FIG. 15

Performance meter block diagram 17900

AUTOMOTIVE PERFORMANCE METER

CROSS REFERENCE TO RELATED APPLICATION

This application is a divisional of application Ser. No. 10/698,552 filed Oct. 31, 2003, which claims priority to U.S. Provisional Patent Application No. 60/422,596 filed Oct. 31, 2002, the contents of which are hereby incorporated by reference as though fully set forth herein.

BACKGROUND OF THE INVENTION

The present invention relates to vehicle status measurement systems, and more particularly, to automotive performance meters for use within vehicles.

Performance car drivers are constantly looking for ways to improve their vehicle's performance and their own driving performance, including maximizing their vehicle's, acceleration.

In one common approach to improving acceleration, a driver tries to change or shift gears while the vehicle's engine is operating within what the driver perceives is an optimal revolutions-per-minute (RPM) range. If the shift is performed within that optimal range, the driver will maximize the average power delivered to the wheels by the engine. In contrast, when gear shifting is performed beyond the optimal range, the rate of acceleration decreases even though the vehicle's RPMs continue to increase. When gear shifting is performed before the optimal RPM range, after shifting, the vehicle will often accelerate sluggishly.

To maximize acceleration from an engine, the engine should be kept in an RPM range that allows the gearbox to deliver an optimum level of power to the wheels just before and just after each gear change. When shifting up, there is typically a loss of RPM, and a gain in RPM when shifting down.

Such changes in RPM occur because there are finite gear ratios in the typical vehicle gearbox. The engine shaft is disconnected from the gearbox, driveshaft, and wheels by means of a clutch. When starting from a stop (engine shaft turning at idle, but wheels not turning at all) the clutch slips until the car has gained enough speed so that the wheels, driveshaft, and gearbox are matched in RPMs with the engine. As vehicle speed increases, the engine reaches its maximum allowed RPM. If the driver wants to further increase vehicle speed, gears must be shifted so that the engine can return to a lower number of RPM while the gearbox/driveshaft/wheels continue increasing RPMs.

Within an optimal RPM range for a vehicle, there is an optimal "shift point," that is, a point in an RPM versus horsepower curve at which the driver of a vehicle should shift gears to maximize average vehicle acceleration. Specifically, the optimal shift point of a vehicle corresponds to a predetermined angular velocity of the motor shaft (i.e., RPM value) that results in maximum power being delivered by the engine to the wheels, both before and after shifting. A graph of the power output of an engine (vertical axis) verses RPMs (horizontal axis) increases to a maximum and then falls off.

Beyond a certain point, increasing RPMs no longer translates into increased power, and thereby vehicle speed, even though more RPMs represent more combustions in the engine per unit time. Rather, the increased RPMs create increased losses, such as vibrations, and other power drains known to those skilled in the art. Also above a certain RPM level (e.g., the "redline" RPM value), an engine can be damaged. Thus, to maintain maximum vehicle speeds, it is desirable to maintain high but not too high RPMs levels.

While drivers, and more aptly, amateur and professional racers, attempt to shift within an optimal RPM range, and ideally at a particular shift point, actually identifying the optimal range and shift point for a particular vehicle and gear is very difficult. Some amateur racers, for example, simply arbitrarily select a shift point, such as an RPM level just below their vehicle's "red line" RPM level. On the other hand, professional racecar drivers spend significant resources analyzing their engines and gearboxes to determine optimal shift points for their vehicles.

Conventionally, shift points are approximately determined under controlled experimental conditions. Determining them involves measuring and then analyzing a particular vehicle's output power versus RPM curves. To generate these curves, one typically measures vehicle power output with a stationary dynamometer. These measurements are then combined with gearbox gear ratios to determine optimal shift points. Although shift points are determined from these curves, the curves, and therefore, the shift points, generally do not account for numerous variables, such as aerodynamic drag, vehicle rolling friction, and drivetrain losses, and other factors which come into play as the vehicle is being driven. Furthermore, such shift points generally must be recalculated when modifications that change the vehicle's RPM and output power characteristics are made to the vehicle.

Accordingly, there is a need for methods and systems that indicate to racers, performance drivers, motor sport enthusiasts and others, optimal RPM ranges and shift points for their vehicles that are low cost, easy to install, and do not require the user to perform complicated and time-consuming analyses of their engines.

Furthermore, there is a need for methods and systems that provide optimal RPM ranges and shift points in a manner that is transparent to the driver, and that dynamically account for variables associated with a moving vehicle, including aerodynamic drag, rolling friction, and drive train losses.

SUMMARY OF THE INVENTION

In one aspect, the present invention therefore provides methods, systems and circuits for analyzing the performance of a vehicle having an electrical system.

In a second aspect, the present invention is a method that determines a shift point while the vehicle is in operation. The shift point is determined using acceleration information, as measured by internal sensors, data and RPM data deduced from the vehicle's DC electrical system.

In a third aspect, the present invention is a performance analyzer for a vehicle. The performance analyzer preferably comprises a microprocessor that dynamically determines a shift point based on real-time calculations of engine power. The microprocessor preferably receives and then processes data regarding the mass, velocity, acceleration and RPMs of the engine deduced from the vehicle DC electrical system. The microprocessor also preferably generates a signal indicating that the vehicle should be shifted as the engine RPM level approaches the shift point.

BRIEF DESCRIPTION OF DRAWINGS

The following discussion may be best understood with reference to the following drawings, described in summary below, which form a part of this disclosure.

FIG. 5 is a diagram illustrating various examples of a display on the performance meter of FIG. 1;

FIG. 14 is a process flow diagram of a preferred embodiment of a method of digitally processing an AC component of the D.C. power bus signal;

FIG. 15 is a process flow diagram of a preferred embodiment of a method of illuminating a shift light indicator;

Like reference numerals are used to designate like parts in the accompanying drawings.

DETAILED DESCRIPTION OF THE PREFERRED EMBODIMENTS

Figure 1:
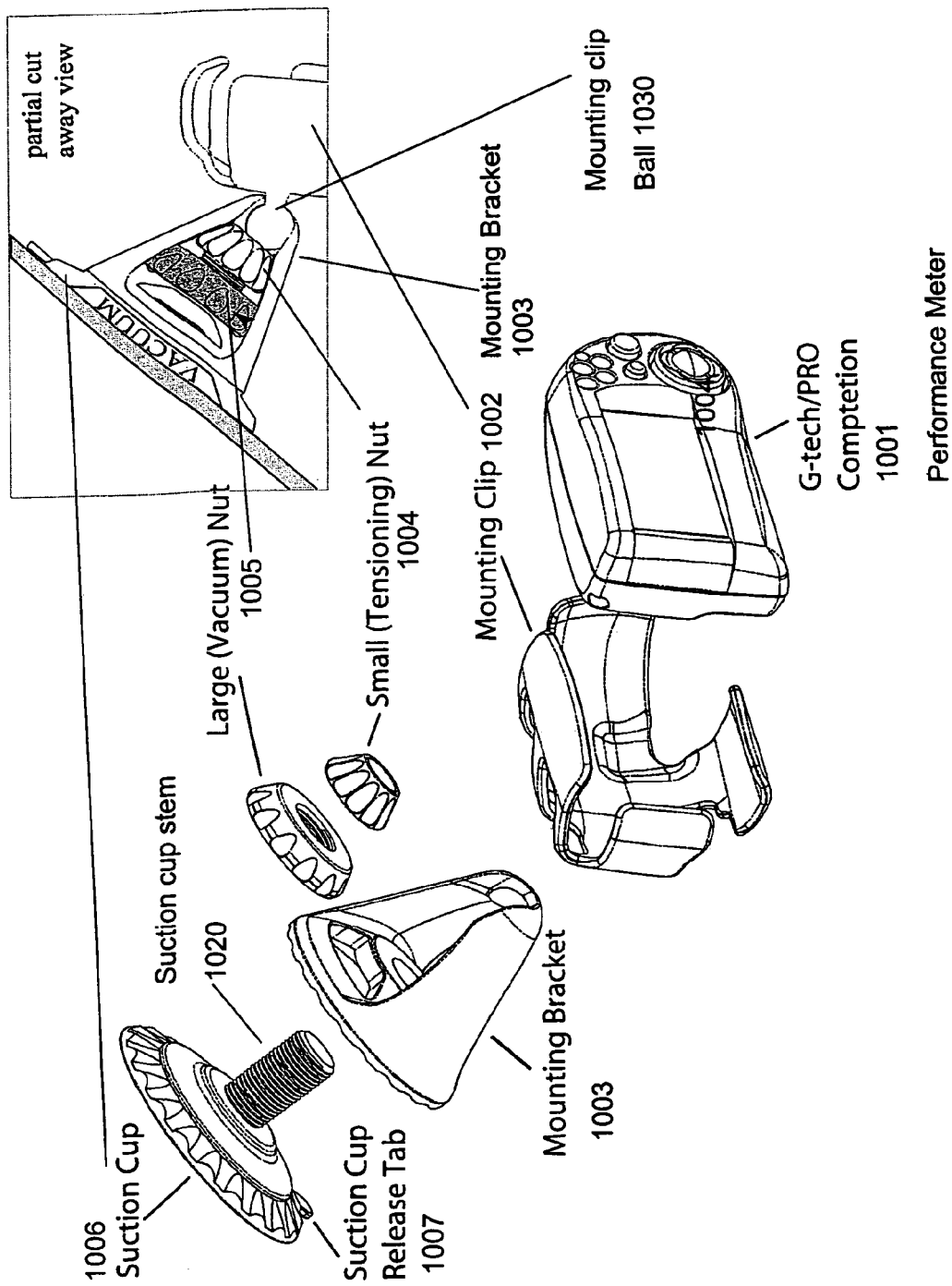
FIG. 1 is a diagram depicting an exploded view of one preferred embodiment of an automotive performance meter that measures vehicle RPMs from the vehicle DC electrical power bus.

An automotive performance meter that a driver can easily install will be described. The meter uses a connection to the vehicle's DC power to derive information needed to generate shift points based on current operating conditions of the vehicle. In particular, unique processes for generating shift points will be described.

The present invention is now described more fully with reference to the accompanying drawings, in which embodiments of the invention are shown. This invention may, however, be embodied in many different forms and should not be construed as limited to the embodiments described. Rather, these embodiments are provided so that this disclosure will be thorough and complete, and will fully convey the scope of the invention to those skilled in the art. In the drawings, the size of functional units is exaggerated for clarity. Like numbers refer to like elements throughout.

Although the present invention is described and illustrated as being implemented by circuitry using a processor, the system described is provided as an example and not a limitation. As those skilled in the art will appreciate, the present invention can be implemented in software, hardware or a combination thereof. For example, a DSP or RISC processor may be utilized in the processing of the measurement of vehicle RPMs. Where the measurement of vehicle RPMs are taken from the vehicle DC electrical power bus.

To the extent embodiments described herein comprise methods, in a given embodiment it should be appreciated that the steps in such methods may be performed in a different order than may be shown, or in an overlapping manner, or omitted unless one step requires the result of another step or an order is specified. Steps may also be repeated, named differently, and/or grouped differently in different embodiments unless specified otherwise. For example, performing steps in an overlapping or parallel manner may be achieved by utilizing parallel microprocessors.

Generally, a shift point is selected for racing such that a maximum transfer of power from the engine to the drivetrain of a vehicle will be maintained, which tends to maximize acceleration and performance, or the average power delivered to the wheels during a race or run. Typically, this racing shift point will be set to occur before the "redline" RPM range. As is known by those skilled in the art, redline for racing engines is typically set at a higher RPM level than for a non-racing vehicle. Non-racing vehicles typically set redline at a lower value, before peak engine power necessarily is achieved to maximize engine life. Racing drivers on the other hand are willing to accept shorter engine life by revving the engine to higher RPMs before redline, if they have a chance of finding a shift point that provides maximum engine power output.

A shift point may be communicated to the driver of a vehicle by lights (i.e., shift lights), audible signals or other ways known to those skilled in the art. Thus, the shift point may correspond to an RPM level at which gear-shifting results in optimal power being generated by the engine both before shifting and after shifting. And a signal may be provided to a driver that he should change gears by the use of a shift light. In one straightforward application of shift lights, a shift light illuminates just before a particular shift point (e.g., redline or some other predetermined level of RPMs) is reached, so that the driver has sufficient reaction time to change gears at the shift point. Such a shift light may be termed a "fixed shift point shift light." The fixed shift point shift light utilizes RPM measurements that are advantageously made through the vehicle's electrical system, which is typically 12 volts.

The typical vehicle DC power system consists of a battery and charging circuit, which typically includes an alternator.

All vehicle electrical sub-systems are powered by or connected to this main DC electrical system, or DC electrical power bus. One can gain access to this power bus by connecting directory to the battery terminals or any other place where the electrical bus is exposed. The typical access point inside the vehicle passenger compartment is through the cigarette lighter socket, or other equivalent accessory connections such as cell phone or computer power ports.

Unlike traditional dynamometer measurements, the embodiments described herein analyze and determine actual or "true" instantaneous power available to propel the vehicle on the fly and preferably in real-time, taking into account such dynamically changing variables as aerodynamic drag losses, vehicle rolling friction losses, and drivetrain losses, and issues which affect engine performance (cooling, intake, etc.).

Dynomometer measurements are historical, being made at some time in the past. Information from the past measurement is then used to make decisions at some time in the future. The usefulness of this approach depends upon how close the current conditions happen to match the past conditions. To eliminate this problem, current and up to date measurements are needed.

There are many potential applications and uses for true power measurements. These measurements may be used to generate "intelligent shift lights", "professional shift lights", or "racing Shift lights". For example, intelligent shift lights that indicate shift points, can use the true power information to provide the driver with an improved indication to shift the vehicle at a time when the vehicle is actually operating in an optimal or near optimal RPM range. Shifting on cue of the shift light generated from current conditions can help a performance driver optimize the average power delivered during a race.

A highly desirable feature of this invention is the use of a coupling or connection to the DC power being supplied to the engine. The connection is easily accessible inside the vehicle and can be used to determine useful information such as revolutions per minute (RPM). RPM measurements are preferably based on periodic electrical signals that are a component of engine electrical noise.

Periodic voltage (or current) profiles based on interpreting noise patterns impressed on vehicle power may be utilized to determine engine RPMs. The embodiments described herein utilize voltage-measuring technology. However, those skilled in the art will realize that current-measuring techniques may equivalently be utilized to determine vehicle RPMS. The periodic electrical signals are caused by various engine components that operate in synchronization with engine RPMs and generate an electromotive force ("EMF"), or voltage. Examples of components are sparkplugs, alternators and the like.

FIG. 1 is an exploded view of a performance meter 1001 and mounting elements for mounting the performance meter 1001 to the interior of a vehicle (not shown). The performance meter 1001 is attached to a mounting clip 1002 that extends partially around the performance meter 1001 and is made of a flexible material so that the performance meter may snap into the mounting clip 1002. The mounting clip 1002 is coupled to a mounting bracket 1003 via a ball pivot assembly that allows the mounting clip 1002 to be rotated relative to the mounting bracket 1003. Rotation allows a user to position the performance meter 1001 so that it can be seen from a variety of angles given different mounting locations and orientations. The mounting bracket 1003 is attached to a stud that is part of the suction cup assembly 1006. The suction cup assembly 1006 is configured to be attachable to a somewhat flat surface such as, for example, a windshield or a plastic or metal dashboard. Suction cup assembly 1006 is equipped with a mounting stud and a suction cup release tab 1007 so that the suction may be released when the user desires to move or remove suction cup assembly 1006.

The suction cup assembly 1006 attaches to the mounting bracket 1003 through a vacuum nut 1005 and a tensioning nut 1004 that are coupled to the stud of the suction cup assembly 1006.

To operate the mounting system, the large nut 1005 is inserted into the mounting bracket 1003. Then, the suction cup 1006 stem 1020 is inserted into the hole at the bottom of the bracket 1003 and screwed into the large nut 1005. When the stem 1020 starts to protrude out of the large nut 1005, the small nut 1004 is inserted into the bracket 1003 and screwed onto the stem 1020. The bracket 1003 is then held by the large nut 1005 only and the suction cup 1006 is pressed down on a hard smooth surface. By pressing down on the large nut 1005, pressure will be placed on the suction cup 1006 stem 1020 which forces air out from beneath the suction cup 1006. The bracket 1003 then sticks to the smooth surface. Next, the mounting clip 1002 is placed into the ball joint of the bracket 1003. The clip is positioned in the desired orientation. Next, the large nut 1005 is tightened. Such tightening pulls up on the suction cup and forces the bracket crenellations down onto the scalloped features of the suction cup 1006. It also raises the small nut toward 1004 the ball of the clip 1002. When the large nut 1005 has consumed all or nearly all the threads of the suction cup 1006 stem 1020, the following is accomplished:

1) A strong partial vacuum is generated beneath the suction cup 1006.

2) The mounting bracket 1003 is held firmly against the edge of the suction cup 1006, preventing it from rotating or moving in any other way.

3) The upper hemispherical surface of the small nut 1004 presses the ball end of the mounting clip 1002 against the similarly shaped end of the mounting bracket 1003 with a vise-like action. The clip 1002 is now held firmly in place.

To re-position the clip, the large nut 1005 is turned several times to loosen the grip on the clip ball 1002. The clip can then be reoriented and the large nut 1005 tightened.

The ball end of the mounting clip 1002 is preferably coated with a layer of rubber, while the rest of the clip is preferably formed of a hard plastic resin. The rubber ball aids in the gripping of the ball and also dampens vibrations.

All of the other bracket parts are preferably made of hard thermoplastic resins such as polycarbonate or ABS. The suction cup (not the stem 1020) is preferably made of a soft elastomeric material.

The small nut 1004 is optional. If all parts are made with the appropriate tolerances, the tip of the stem 1020 could be made hemispherical and press directly against the ball 1030 of the clip 1002. Such would reduce the number of components. Because there are always variations in tolerance with any economical manufacturing process, the small tensioning nut 1004 lets the user effectively extend the length of the stem 1020 so that a tight fit is guaranteed.

Figure 2:
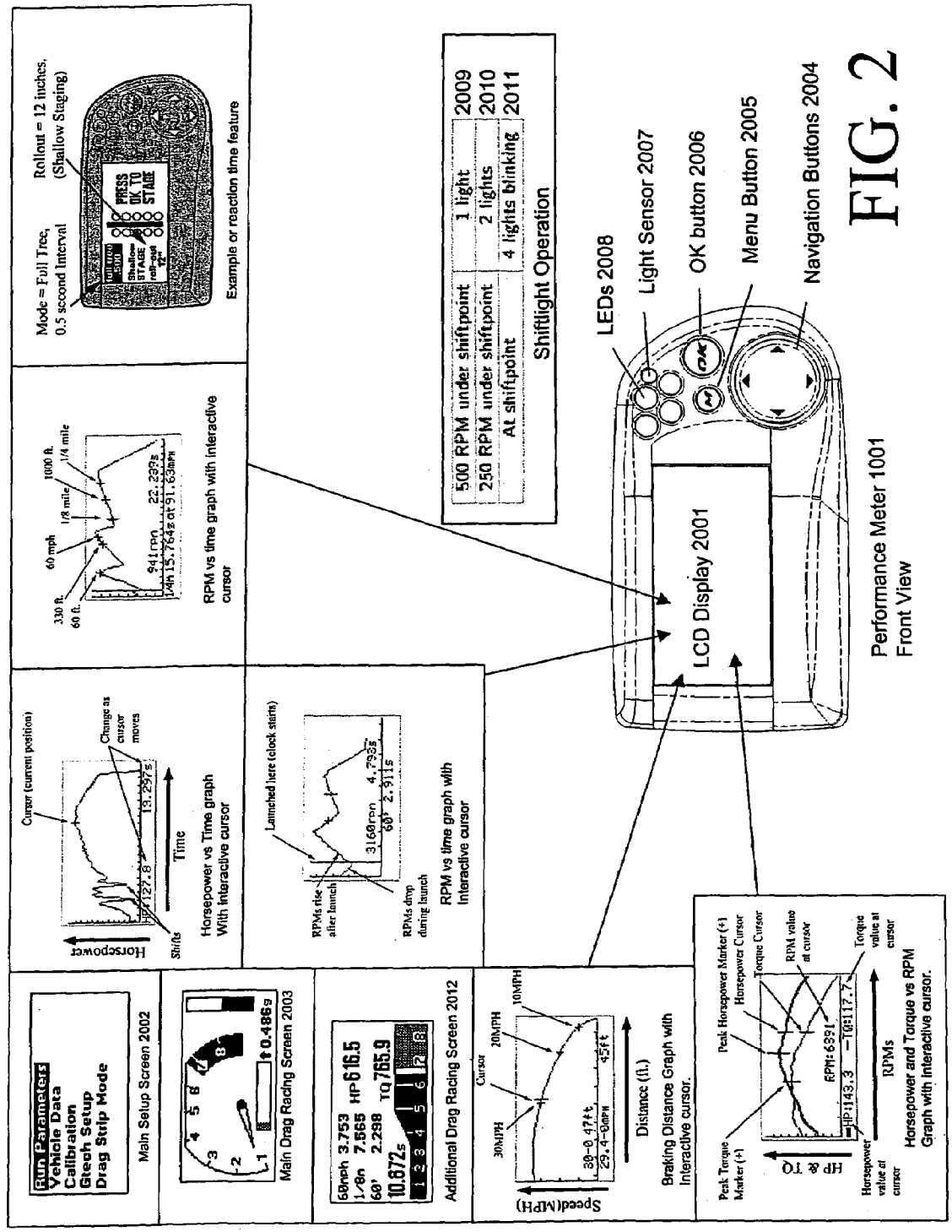
FIG. 2 is a diagram depicting a front view of the performance meter of FIG. 1.

FIG. 2 is a front view of the performance meter 1001. The performance meter 1001 includes a-display 2001 that as shown in the exemplary embodiment is an LCD display. However, equivalent display types such as an LED display or equivalent may be substituted for the LCD display 2001.

After powering on the performance meter 1001, a main set up screen 2002 preferably appears that allows the driver to select a calibration routine, vehicle data routine, set up routine or a drag racing mode. A typical screen that would appear during use of the performance meter is the drag racing screen 2003. The screen 2003 appears much like a typical tachometer display with a red line provided at the darkened portion of the scale as shown on screen 2003. Alternatively, bar graphs may be displayed.

The performance meter 1001 preferably also includes an input interface, such as buttons 2004, 2005, 2006, a light sensor 2007, and LEDs 2008 on one (i.e., the front) face of the performance meter 1001. The input interface may alternatively include other light emitting elements that may be turned on and off. A navigation button 2004 is also preferably disposed on the body of the performance meter 1001. The navigation button 2004 is shown as a conventional rocker type assembly having two principle axes of motion to guide a cursor on LCD display 2001. As an alternative to a navigation button 2004, a joy stick, a track pad, or the like may be equivalently substituted. A conventional menu button 2005 is preferably included to select the menu display such as when the user decides to exit the main drag speed display 2003 to enter vehicle data or other data input operations. An "OK" button 2006 is preferably disposed on the body of the performance meter 1001 to signal entry of a function or the completion of entry of data. The performance meter 1001 also preferably includes a light sensor 2007 to adjust the brightness of the LCD display illumination 2001 or LED indicator lights 2008 according to ambient light conditions. A group of LEDs 2008 are included to signal to the driver optimal times to shift gears. In the embodiment shown, four LEDs or equivalent light sources are shown; however, those skilled in the art will appreciate that equivalent configurations of shift lights may be provided to communicate start and end shift points. Also, a shift light may be provided to indicate when the engine at an RPM level in the redline region.

In the embodiment shown, four blinking lights indicate that the vehicle has reached the shift point 2011. Also, two lights indicate that the engine is turning at 250 rpm under the shift point 2010, and one light illuminated indicates that the engine is turning at 500 rpm under the shift point 2009. Alternatively, other signals or combinations of signals may be used including blinking lights and audible cues, to convey shift point information to a driver. Other schemes to trigger shift lights may be utilized as well. For example differing RPM levels, dependent upon the particular gear the vehicle is in, or the level of RPM for a shift point may depend upon the acceleration.

Figure 3:
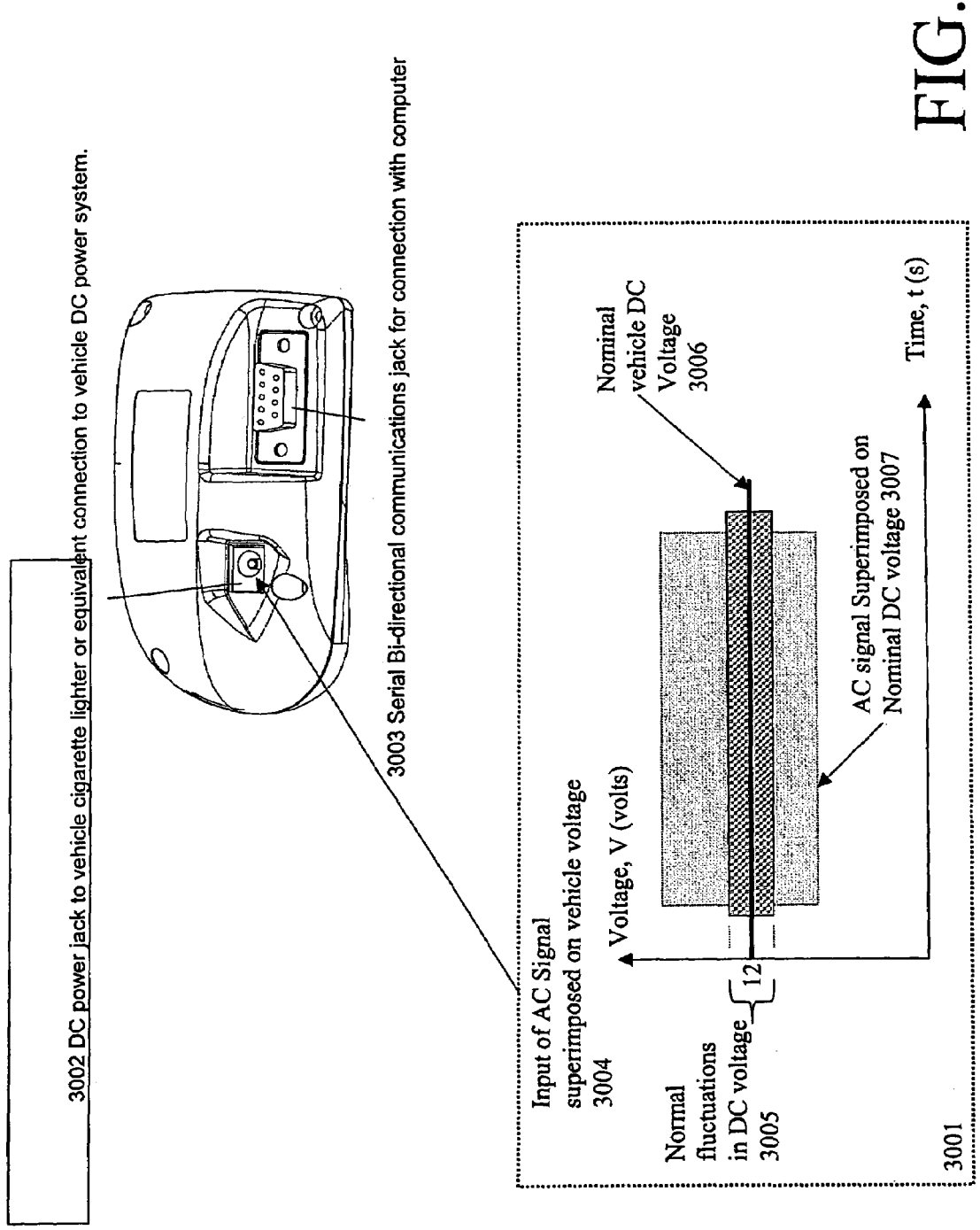
FIG. 3 is a diagram depicting a back view of the performance meter of FIG. 1 with a DC input signal from the vehicle DC electrical power bus from which engine RPMs are found, and from which the performance meter draws its electrical power.

FIG. 3 is a diagram of a back side of the performance meter 1001. Performance meter 1001 detects engine RPMs via a DC signal 3001 that is applied to a DC power jack 3002 located on the back of performance meter 1001. The DC power-jack 3002 is coupled to the DC power bus of the vehicle preferably through the vehicle's cigarette lighter or an equivalent connection.

The embodiments of the invention do not require that the electrical system has a computer or any sensors that are common in many modern vehicles. The performance meter utilizes AC signals produced by the engine, and does not need to rely on any secondary control signals that are typically generated by engine microcontrollers and the like. Only one connector is typically needed, the cigarette lighter plug, or its equivalent. The cigarette lighter plug was originally designed to simply hook up directly to the 12V battery terminals. In the language of automotive electronic accessories, devices that plug into this type of socket are considered 'No Installation' devices. Radar detectors typically also fall into category. To use the meter simply plug it in and use it, then simply unplug it and put it away for safekeeping. No hard wiring is required.

The battery terminals are connected to the vehicle alternator for charging, and since the alternator is connected to the ignition system, the cigarette lighter plug will be subjected to the various electrical interference caused by both alternator and ignition systems. Since both ignition and alternator are intimately linked to the engine shaft, they will both produce AC electrical signals, which mirror the RPMs of the engine shaft. The typical cigarette lighter only uses the DC component, as does your typical radar detector or map light. The embodiments of the invention use the DC voltage to power its circuitry. The embodiments of the invention also use the AC voltage, coupled by the same wire as the DC voltage. Circuitry inside the performance meter separates the DC for powering electronics and the AC for signal processing RPM measurements.

The voltage profile of a typical vehicle electrical system 301, shows the superposition of an AC signal 3007, on the nominal DC voltage 3006. A vehicle typically runs from a nominal voltage, for example, 12 volts 3006. This voltage fluctuates during the operation of the engine 3005. Typically the upper limit in a car is 14 volts, which is the charging voltage produced by an alternator, and 12 volts is the nominal battery voltage. Other sources of variation known to those skilled in the art would be included in defining the nominal range. The AC signal 3007, is typically a signal which is generated by a device which is synchronized to the engine revolutions. For example the alternator is connected to the engine shaft by means of a belt, the spark plugs fire by means of another (timing) belt, and so on. Simply put the meter utilizes a source of DC (for power) and a source of engine synchronized AC which is superposed (often filtered/suppressed by the manufacturers, but never 100% successfully) on the DC will suffice. A separate source of AC and a separate source of DC (such as internal batteries to the meter) may be combined in the meter. In the main embodiments the needed power/signal is taken from the battery terminals usually by means of the cigarette plug (if one is present, or if it is a convenient connection).

Those skilled in the art will realize that the battery terminals, the alternator output, and the cigarette plug are nearly always connected in parallel. Connecting to any or one of them is electrically identical.

Some typical application examples of electrical systems that will work with the performance meter include: atypical car (battery, alternator, sparkplugs/ignition), a typical motorcycle (battery, generator, sparkplugs/ignition), a typical diesel engine (battery, alternator, no sparkplugs), a typical dirt track car (battery, sparkplugs/ignition), a typical classic car (alternator, sparkplugs/ignition without a battery and having a hand crank starter), and a typical 2 stroke moped (alternator/generator, sparkplugs/condenser coil, no battery).

The DC power that is distributed throughout the vehicle is typically not a clean DC signal, as there are AC components superimposed onto it. The DC power bus is used to start the engine and keep it going by supplying energy to create a spark to ignite the fuel at the appropriate time during engine operation, as will be appreciated by those skilled in the art. In the embodiment shown, the voltage level is 12 volts, however, automotive systems utilizing other voltages may be substituted for the 12-volt system shown.

RPM-dependent AC voltages on the 12-volt signal allow the engine RPM data to be determined. For example, noise generated by firing spark plugs, the alternator and various other components cause periodic and a-periodic signals to appear to be superimposed on the 12-volt battery level typical to most vehicles. The periodic nature of signals superimposed on the 12-volt power of the vehicle is preferably analyzed by the performance meter 1001 to determine vehicle. RPMs.

A bi-directional digital communications port 3003, for data transfer to, and from, a computer is also disposed on the backside of the performance meter 1001. Equivalently, alternative types of jacks, or connections may be provided. For example USB, fire wire, or Ethernet. In alternative embodiments, a wireless connection to the bi-directional communications port is provided that allows wireless coupling according to the Bluetooth standard or other standards known to those skilled in the art. When the performance meter 1001 is removed from the vehicle, a user may connect the performance meter 1001 to a computer and download data that has been collected, typically after a period of use in the vehicle. While coupled to a computer, firmware, configuration information and software updates may also be loaded into the performance meter. Software update information may originate from a disk, CD, Internet resource or other convenient source.

Figure 4:
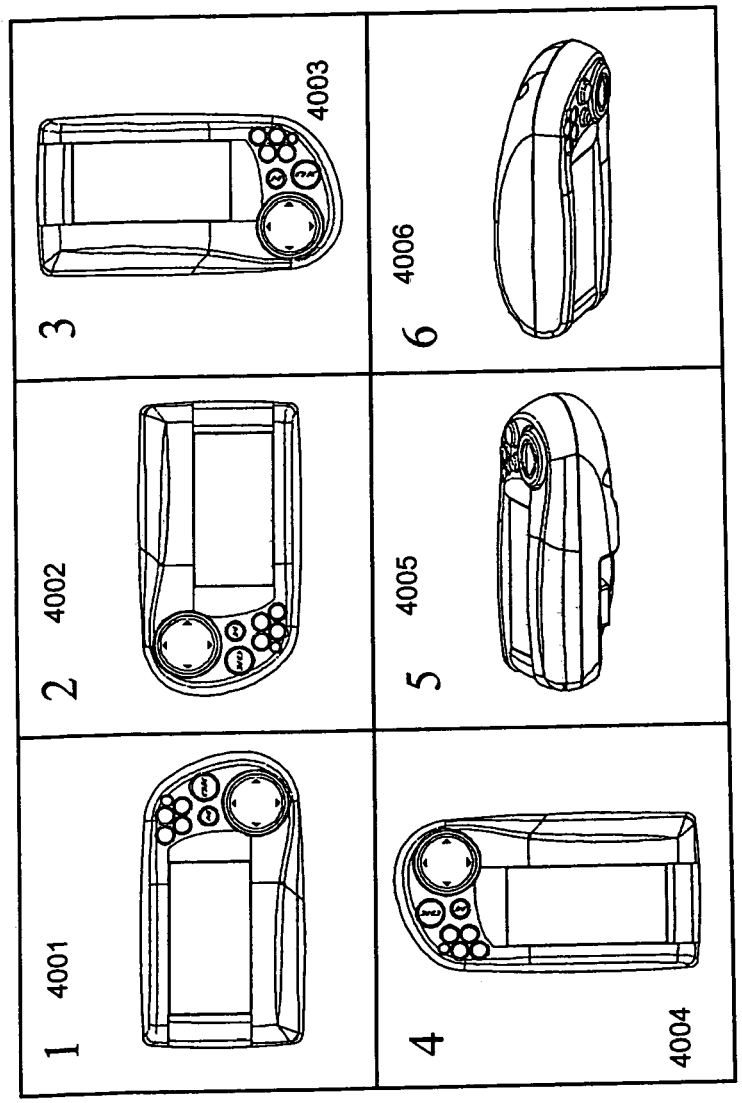
FIG. 4 is diagram showing various orientations of the performance meter of FIG. 1 for calibrating acceleration gauges.

FIG. 4 shows six orientations of the performance meter 1001 during various stages of a preferred calibration routine. The performance meter 1001 preferably utilizes a plurality of acceleration sensors mounted in orthogonal relationship to each other, or mounted in such a way such that the principal basis vectors span all of three-dimensional space. Acceleration sensors may be integrated into a single unit, or may be separate acceleration units mounted on the axis just described. A typical calibration routine includes turning the performance meter 1001 at various angles as shown 4001, 4002, 4003, 4004, 4005 and 4006. This routine is preferably performed during manufacture, or can be re-produced by the user in the field.

FIG. 5 is a diagram showing an example of a display 5001 while the performance meter 1001 is being used. Forward and lateral acceleration are preferably shown in bar graph form. The vertical & lateral acceleration as well as the x acceleration are made to align with the actual sensor axes via a mathematical coordination rotation process, as known to those skilled in the art.

A simulated tachometer display is supplied with the shift light set point display. The shift light set point is user-specified, and typically equal to or less than the redline RPM value. During a calibration routine, a user would initiate the calibration of the unit's RPM measuring capabilities and be prompted to "rev" the engine at a certain number of RPMs. While the driver or user holds the engine RPMs at the desired level, the performance meter 1001 through its internal circuitry synchronizes upon the input RPM dependent AC voltage electrical signal (3001 of FIG. 3) to synchronize with, or correlate to, the noise present on the DC power bus. Accordingly, the proportionality constants that relate the period of the engine noise to the RPMs may be determined. Once the calibration is completed, the unit may correlate RPMs to the frequency of the AC voltages present at the tap point (e.g., cigarette lighter) of the 12-volt power bus. As the number of revolutions change and the noise pattern changes, calibration allows computation of the correct current revolutions.

Displays 5002, 5003, 5604 and 5006 show examples of various screens on the performance meter 1001 that might be seen by a driver during various maneuvers while driving. Display 5002 shows an example of the display of a wide right turn with acceleration. The figure of display 5003 shows an example of the display of left turn with some braking. Screen 5004 shows an example of the display of braking with some turning. And screen 5006 shows an example of a display when positive acceleration is occurring in a straight line.

The performance meter can be set to alert the driver when the lateral acceleration exceeds a set level. Before embarking the driver enters, via the user interface, a set value of lateral acceleration (referred to as the maximum level). When the absolute value of the instantaneous measured lateral acceleration exceeds the set value the LED (2008 in FIG. 2) indicators illuminate fully. The user may also enter a lower level of lateral acceleration. When the absolute value of the instantaneous measured lateral acceleration exceeds the stored lower level, the LED lights preferably start to blink. The blinking rate preferably increases linearly until the maximum level is reached, at which point the LED lights are illuminated without blinking. For any higher value of absolute lateral acceleration the lights preferably remain illuminated. When the lateral acceleration drops below the maximum level, but not below the lower level, the lights preferably blink. When the absolute lateral acceleration drops below the lower level, the LEDs preferably extinguish completely.

Figure 6:
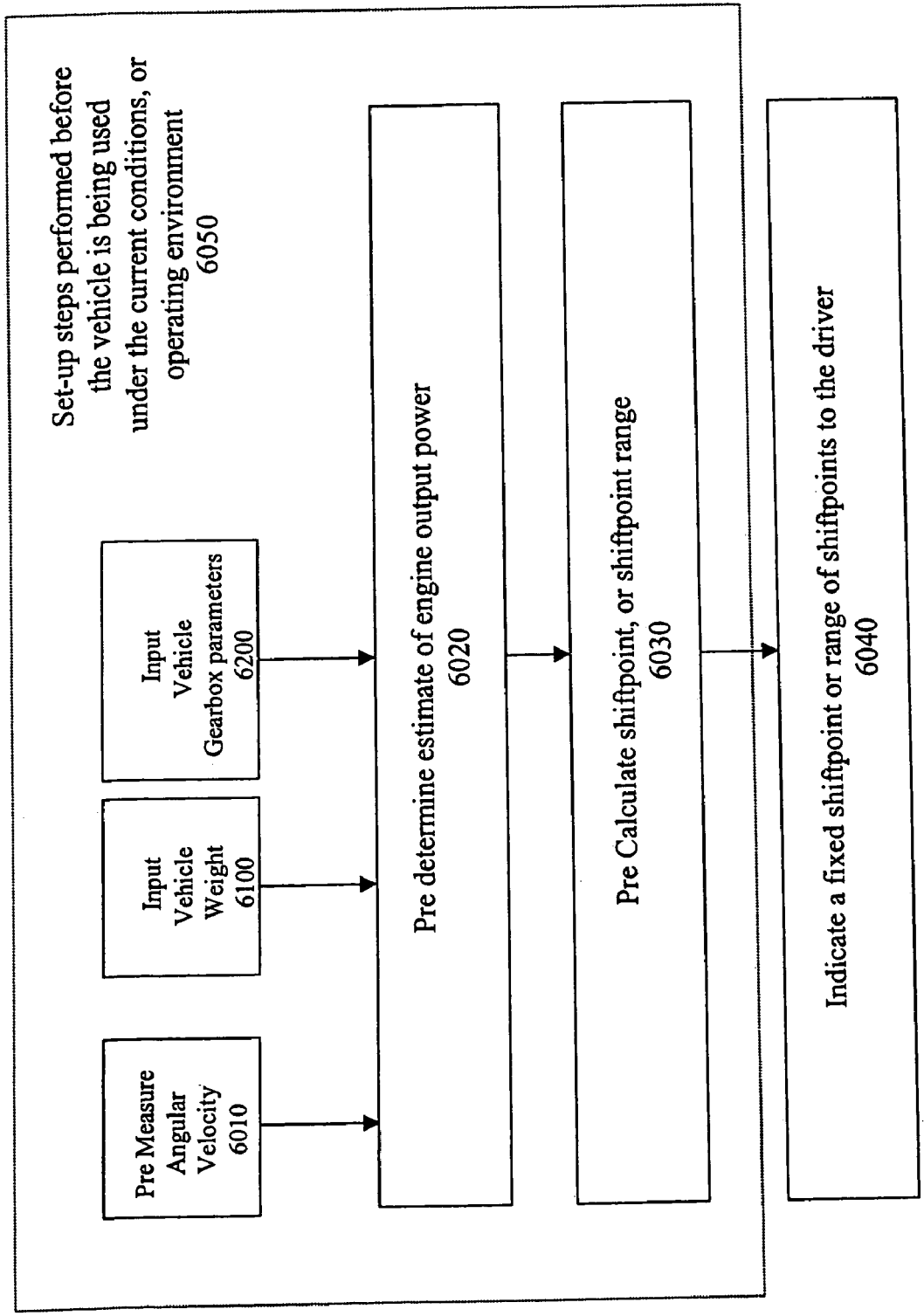
FIG. 6 is a process flow diagram for a conventional method of generating a shift point for shifting gears.

FIG. 6 is a process flow diagram depicting a conventional approach to determining a shift point. This type of set up is typically done at some past time prior to actual use. Measurements are pre-made and then used when the vehicle is being used, hopefully, under the same conditions. Typically, the vehicle weight 6100 and gearbox parameters 6200 are considered in combination with the engine RPMs 6010, to perform a step 6020 of estimating engine output power. In a next step 6030, a shift point is calculated, which is applied regardless of driving conditions that are encountered. In a final step 6040, the shift points are communicated to the driver so that the driver knows when to shift gears.

Figure 7:
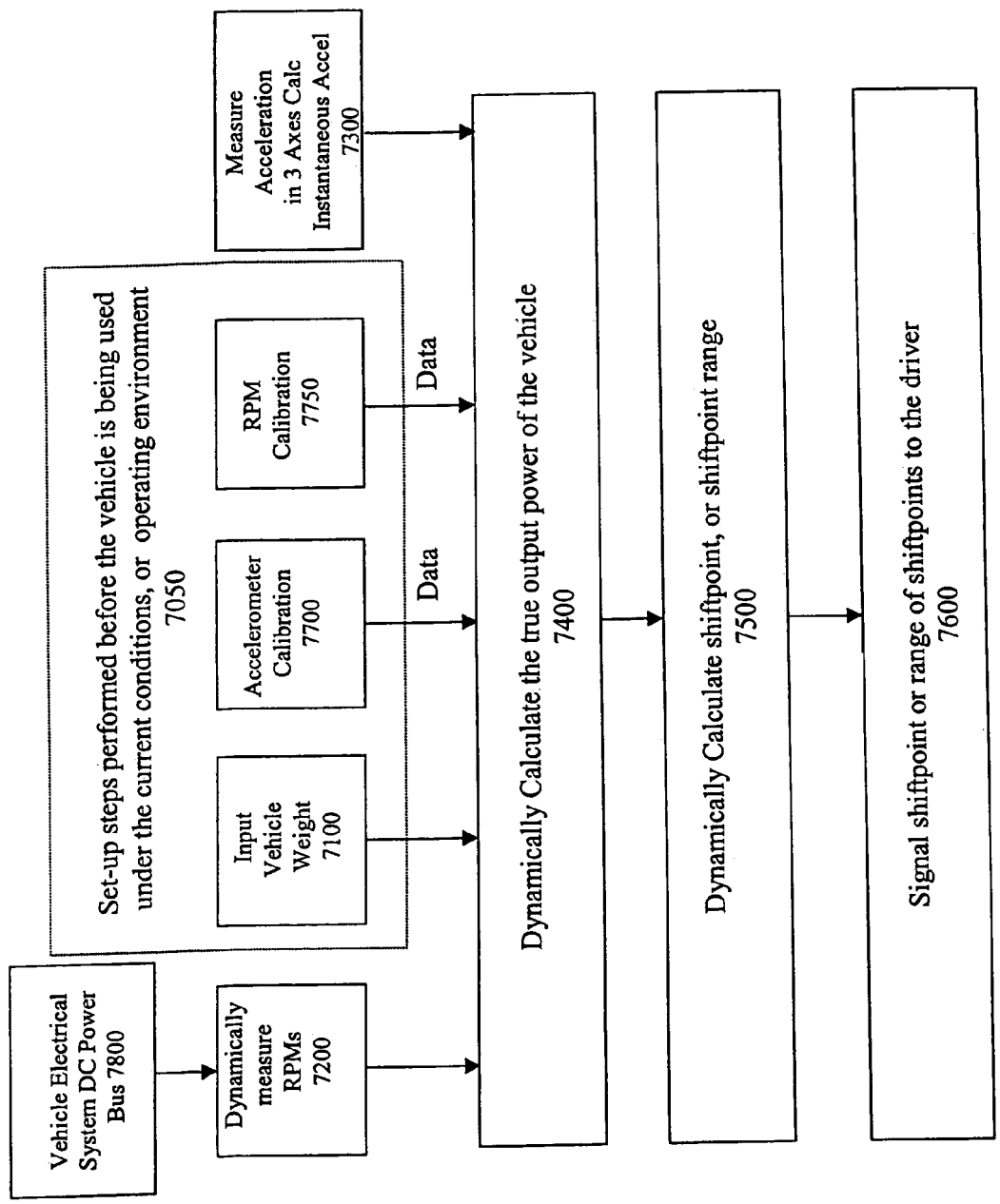
FIG. 7 is a process flow diagram of a preferred embodiment of a method of generating a shift point for shifting gears, while accounting for variables associated with vehicle motion.

FIG. 7 is a process flow diagram illustrating a method of generating a shift point signal. This process is performed while the vehicle is being used and the results calculated at the instant they are needed. Vehicles typically have an engine with a main motor shaft for transferring the typically linear motion of the pistons to rotary motion that turns the wheels. In piston driven engines, the main shaft is typically coupled to the pistons through a crankshaft that converts linear to rotary motion. Equivalently, other types of engines, such as rotary engines, are all equipped with drive shafts to rotate the wheels.

As used herein, the phrase "angular velocity of the motor shaft" corresponds to the engine revolutions per minute (RPM) of the engine, and is used interchangeably with the term "RPM level."

At step 7050, set up data and calibration data 7100, 7700, and 7750 are collected and stored when the performance meter 1001 (at FIG. 1) is initially powered up (during factory production and/or in the hands of the end user).

Figure 9:
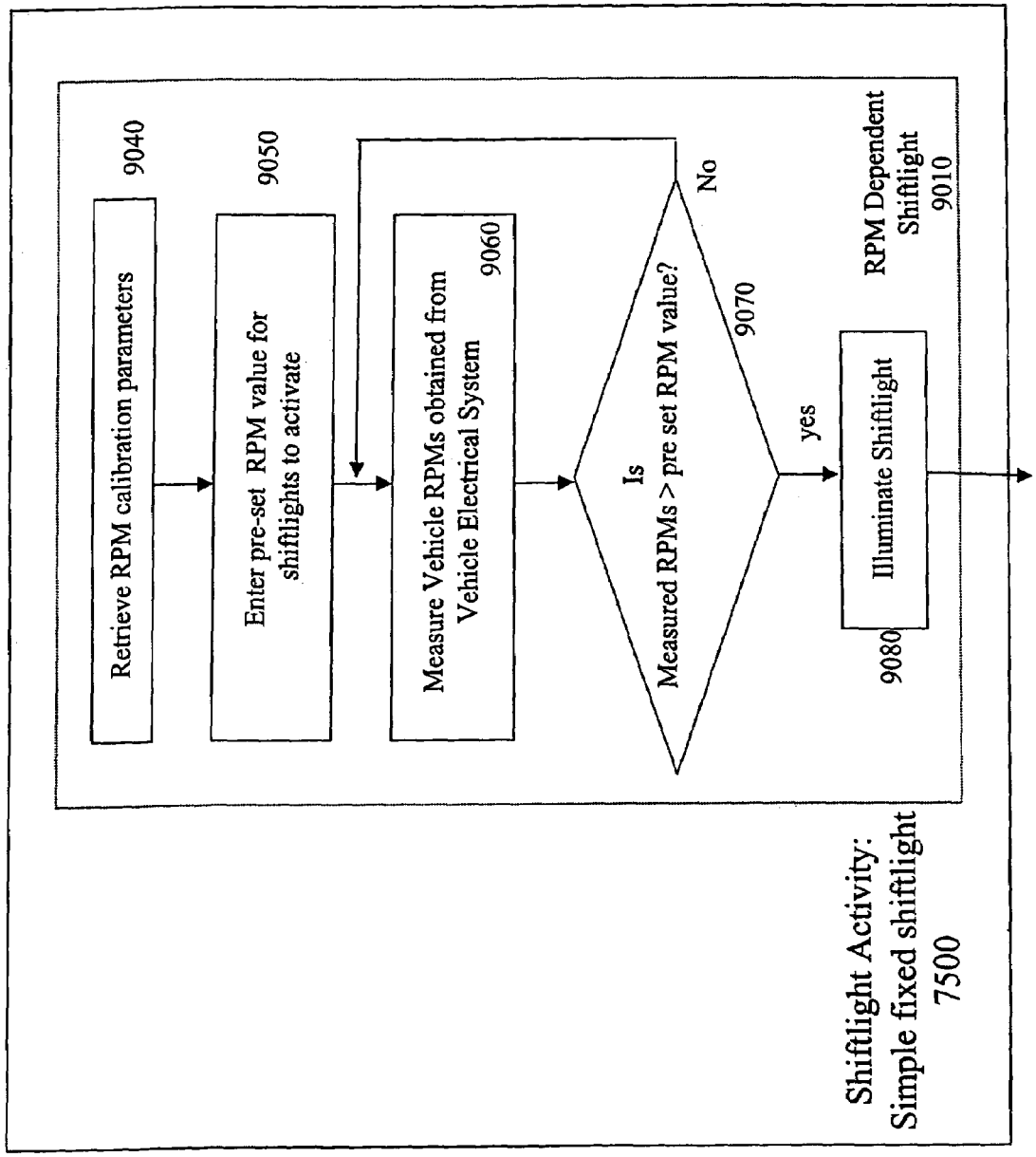
FIG. 9 is a process flow diagram of a preferred embodiment of a method for determining a shift point, and which is generally represented as step 7500 in FIG. 7.
Figure 18:
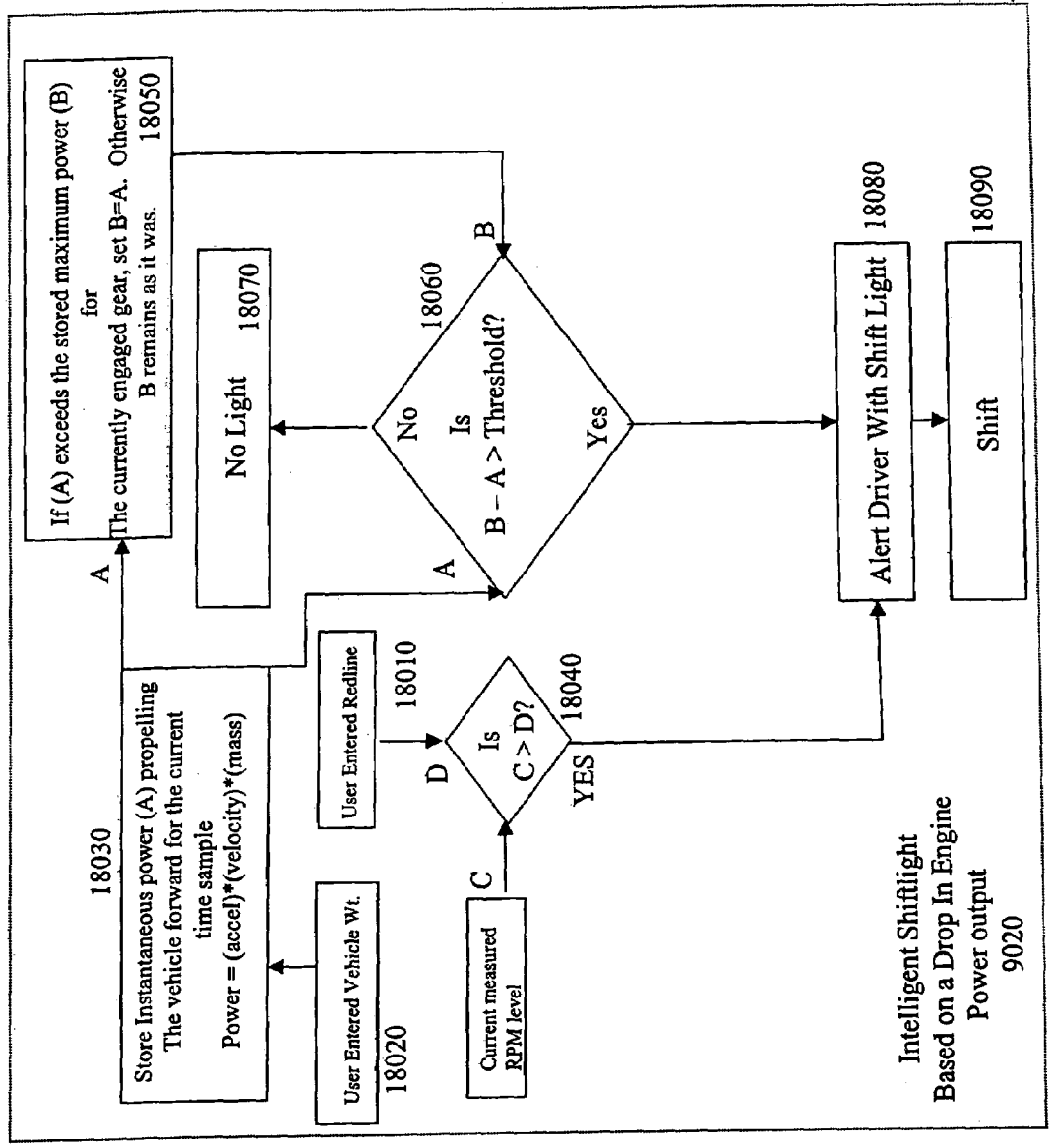
FIG. 18 is a process flow diagram of a preferred embodiment of a method of illuminating a shift light indicator based on a drop in engine power output.
Figure 19:
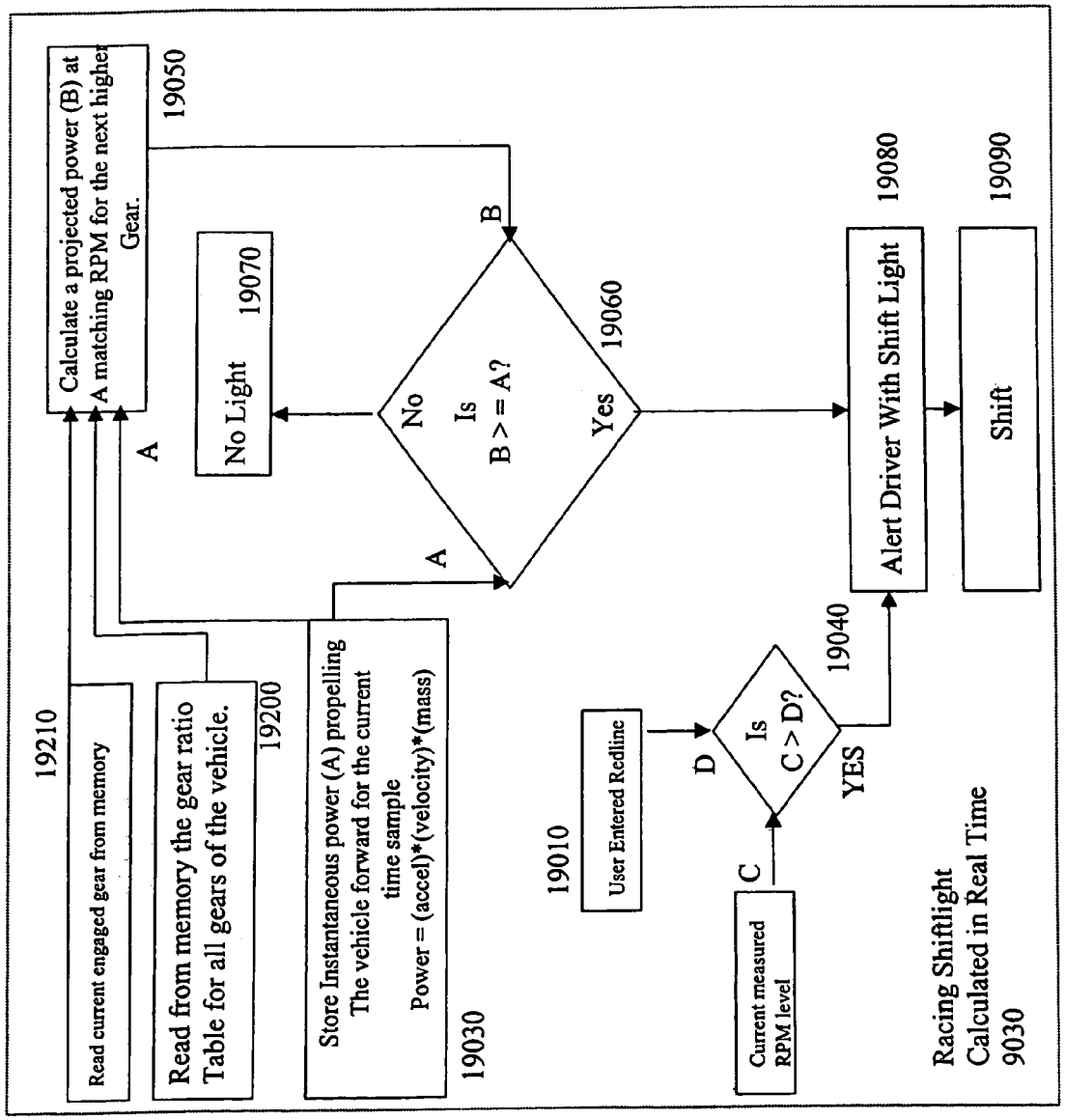
FIG. 19 is a process flow diagram of another preferred embodiment of a method of illuminating a shift light indicator.

At step 7200, an RPM signal that includes information about the RPM level is measured while the vehicle is in motion. This RPM level is measured from the DC power supply to the vehicle that possesses and AC component based on engine rotation 7800. At step 7300, an acceleration signal data is generated while the vehicle is in motion. At step 7400, an output power signal for the vehicle (as opposed to engine output power) is determined based on the acceleration, velocity, RPMs and mass of the vehicle. At step 7500, a shift point is preferably calculated using information about the RPM level and output power information. As a result, shift points may be determined just prior to the time the driver is going to change gears, while the vehicle is being driven. A variety of shift points may be generated to be used at step 7500. Three methods of generating the shift points are shown in FIGS. 9, 18 and 19.

The process for determining shift points tends to recognize that shift points are likely to change while the vehicle is moving depending upon operating conditions, such as wind resistance. Also, shift points may be different when changing between gears. These changes may be explained by differing friction losses for different gears, more drag at higher speeds, better cooling and air intake at higher speeds, and the like. The shift points are accordingly updated continuously since data with respect to acceleration and velocity is continuously available when the vehicle is in motion. The data is collected and the internal memory of the performance meter 1001 (of FIG. 1) is updated. Some prior entry of information is used, including prior entry of the mass of the vehicle, to determine real-time power output using the basic formula for power shown below in equation (2). Maximum horsepower can also be calculated using equation (2).

$$\text{Force} = \text{mass} * \text{acceleration} \quad (1)$$

$$\text{Power} = \text{Force} * \text{velocity} \ \text{mass} * \text{acceleration} * \text{velocity}. \quad (2)$$

Torque is related to power via equation (3) below in which:

$$\text{Power} = (RPM * \text{Torque})/c \quad (3)$$

where c is a proportionality constant. In the case of Power being expressed in units of Horsepower, RPM in units of revolutions per minute, and Torque in units of foot-pounds, c is approximately equal to 5252.

Torque and horsepower are preferably graphed as a function of RPM for the gear where the largest horsepower is detected. Those skilled in the art will realize that engine horsepower as measured at the crankshaft is not a function of the gear since it is measured without the gearbox being present. However, rear wheel horsepower is affected by the gear due to the frictional differences present in each gear. RPMs versus time, velocity versus time, and Gs versus time preferably are also graphed.

By using the formulas above, the performance of a vehicle may be analyzed to determine a shift point. Velocity and acceleration information are preferably determined based on signals present in the performance meter's electrical system, due to the built in sensors (e.g., accelerometers). Their values are preferably measured while the vehicle is being driven, using acceleration data from the internal sensors and RPM data generated from the vehicle DC electrical system.

At step 7600, a signal to the operator is preferably generated indicating that the vehicle should be shifted as the vehicle approaches the shift point.

Figure 8:
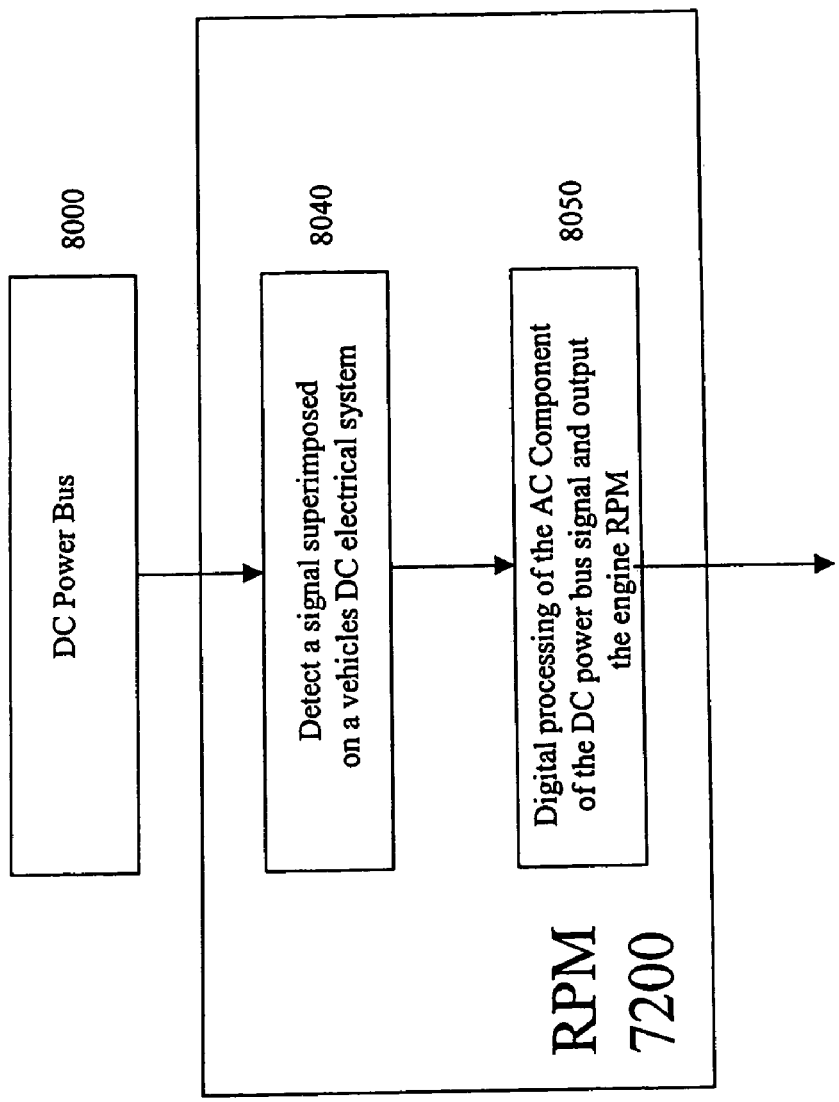
FIG. 8 is a process flow diagram of a preferred embodiment of a method for dynamically measuring angular velocity of a motor shaft and producing a representative signal while the vehicle is in motion, and which is generally represented as step 7200 in FIG. 7.

FIG. 8 is a process flow diagram depicting a preferred method for measuring angular velocity (step 7200 of FIG. 7) used to determine RPMs. The output of the vehicle DC power bus 8000 is input into the process 7200. At step 8040 the AC signal which is superposed on the DC input is separated and readied for processing. Step 8050 processes the readied signal and outputs the resulting RPM value by digital processing of the AC component of the DC power bus signal.

The signals of interest from the vehicle's electrical system are typically low levels of noise introduced by the engine and superposed on the DC power bus. Different methods can be utilized to detect or measure low-level noise as will be appreciated by those skilled in the art, and these methods typically depend upon the type of low-level noise that is present.

In one embodiment, the low level of noise is "spiky" noise generated due to firing of spark plugs. Spiky noise comprises a plurality of spikes impressed on the DC voltage. As previously described, the electrical signals superposed on the electrical system can be detected by measuring spiky noise that is superposed on the automotive DC electrical system.

The electrical noise pattern is proportional to the RPM level. Each cylinder in a vehicle typically has a spark plug that generates a back EMF or voltage spike when it discharges.

Spikes are generated on the predominantly DC voltage of the vehicle's electrical system (typically 12VDC) each time a spark plug fires. Spikes in the DC vehicle voltage can be detected, measured, timed, and counted by a processor having appropriate interface circuitry. The spikes generally are distinct and of very short duration. By analyzing spark plug generated EMF, the RPM value of the engine can be measured with sufficient accuracy. Those skilled in the art will appreciate that accuracy increases with the length of time over which a series of spikes are monitored. Also, the frequency of occurrence of the spikes tends to be directly related to engine RPMs. The number of cylinders firing per engine shaft revolution is directly proportional to the number of engine cylinders by an integer constant of proportionality. For example, a typical four stroke engine fires two cylinders at a time, with two spikes per engine revolution, etc.

The time between leading edges of spikes is measured. The number of spikes during a known time interval is counted to generate a number proportional to the RPM level. Again, the number of spikes for a fixed period of time is proportional to the RPM level. Based on this information, RPM levels can be determined.

Other methods of defining angular velocity of the motor shaft are possible. Many newer cars have filtering electronics to effectively suppress spike signals that can be used to determine engine RPMs. Other cars, such as those with diesel engines, do not have sparkplugs.

It has been found, however, that most vehicles have a fast AC component superposed on their DC power system. Generally, this nearly sinusoidal, rectified ripple signal is a remnant of the conversion process from the AC alternator/generator to 12VDC. Since the alternator is directly attached (typically by means of a belt and pulley system) to the engine crankshaft, the RPMs of the alternator as well as the ripple it generates are directly proportional to the engine RPMs.

The low level noise is continuous noise generated by an alternator and other sources. The AC alternator/generator is directly connected to the motor shaft such that an angular velocity of the AC alternator/generator is directly proportional to the RPM level. The AC alternator/generator generates an AC voltage based on the angular velocity of the AC alternator/generator, and the angular velocity of the AC alternator/generator is directly related to the frequency of the ripple signal. The AC voltage generated by the AC alternator/generator is converted into the DC voltage generated by the DC electrical system. The ripple signal is a rectified, substantially sinusoidal signal, that is a remnant of the AC voltage, superposed on the DC voltage.

The AC electrical signals that comprise a ripple signal of continuous electrical noise generated by an alternator and other sources are detected. These AC electrical signals are superposed on a DC voltage generated by the DC electrical system.

FIG. 9 shows how the shift point is signaled to the driver (7600 of FIG. 7.) for the embodiment of a simple fixed shift point, a fixed RPM level which was previously stored into memory by the user. Step 9040 retrieves RPM calibration parameters. Step 9050 retrieves the previously entered point where the shift is to occur. The current RPM level is measured in step 9060. A comparison 9070 of the current RPM is made to the setpoint RPM value that triggers the shift light illumination 9080.

Figure 10:
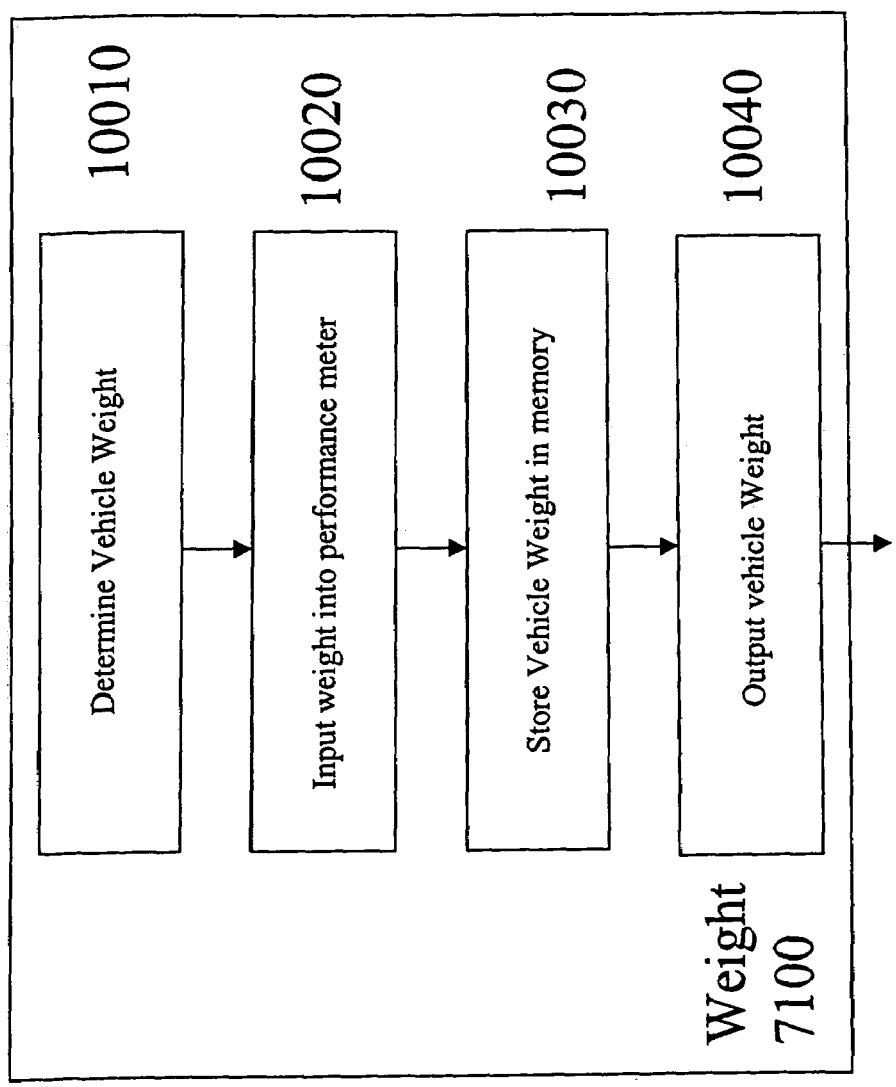
FIG. 10 is a process flow diagram of a preferred embodiment of a method of inputting vehicle weight, represented generally as step 7100 in FIG. 7.

FIG. 10 is a flow diagram showing how vehicle weight is processed (7100 of FIG. 7). At step 10010 the vehicle weight is determined by conventional methods such as a vehicle scales, or other methods known to those skilled in the art. At step 10020, the vehicle weight is input manually to the performance meter 1001. At step 10030, the data is transferred to a memory. At step 10040, vehicle weight is outputted when needed. The output may be an analog or digital signal produced by methods known to those skilled in the art.

Figure 11:
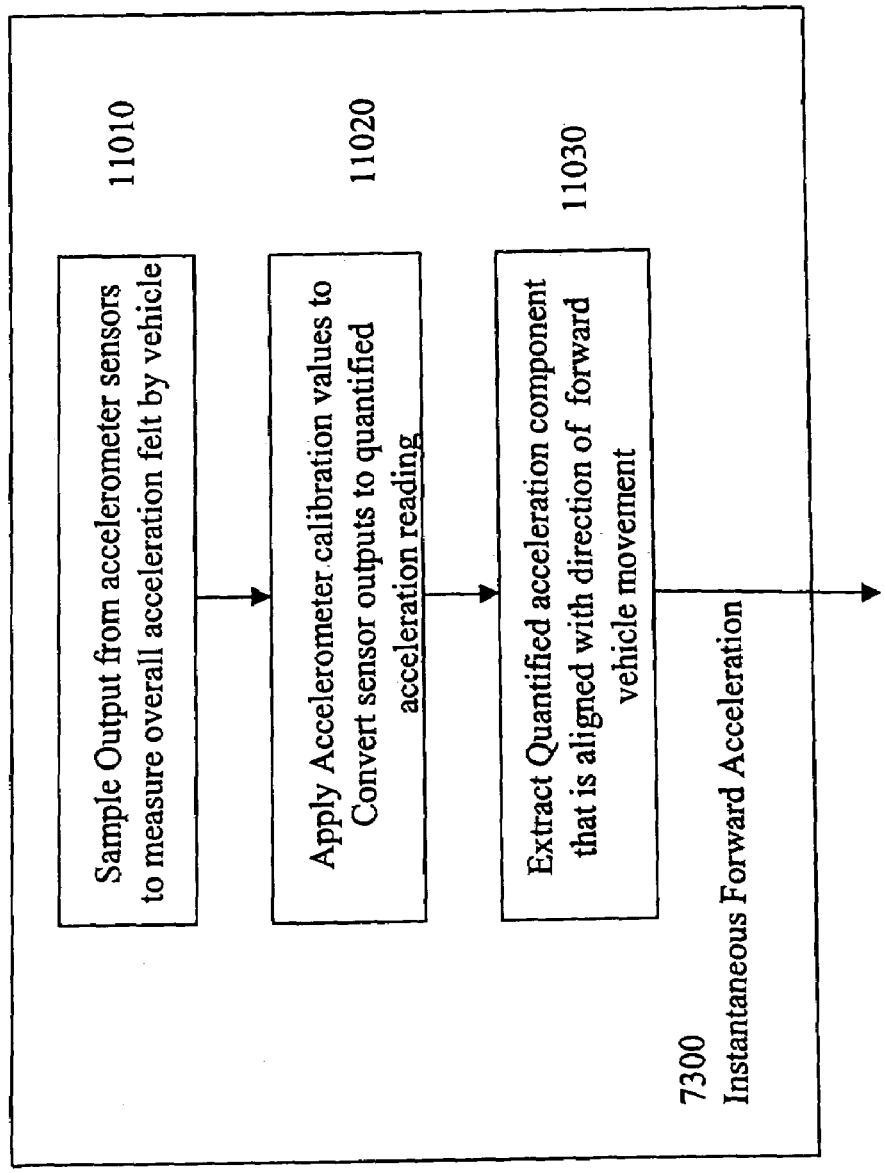
FIG. 11 is a process flow diagram of a preferred embodiment of a method of measuring instantaneous acceleration of a moving vehicle and which is represented generally as step 7300 in FIG. 7.

FIG. 11 is a flow diagram showing the steps in determining instantaneous acceleration (7300 of FIG. 7).

At step 11010 the output from all three accelerometer sensors is sampled. The resulting signal is proportional to the overall three-dimensional acceleration vector experienced by the vehicle.

At Step 11020 the calibration values are applied against the measured data to generate a quantitatively meaningful three-dimensional acceleration vector, by methods known to those skilled in the art.

At Step 11030 the forward acceleration vector is calculated by methods of vector projection, as known to those skilled in the art.

Figure 12:
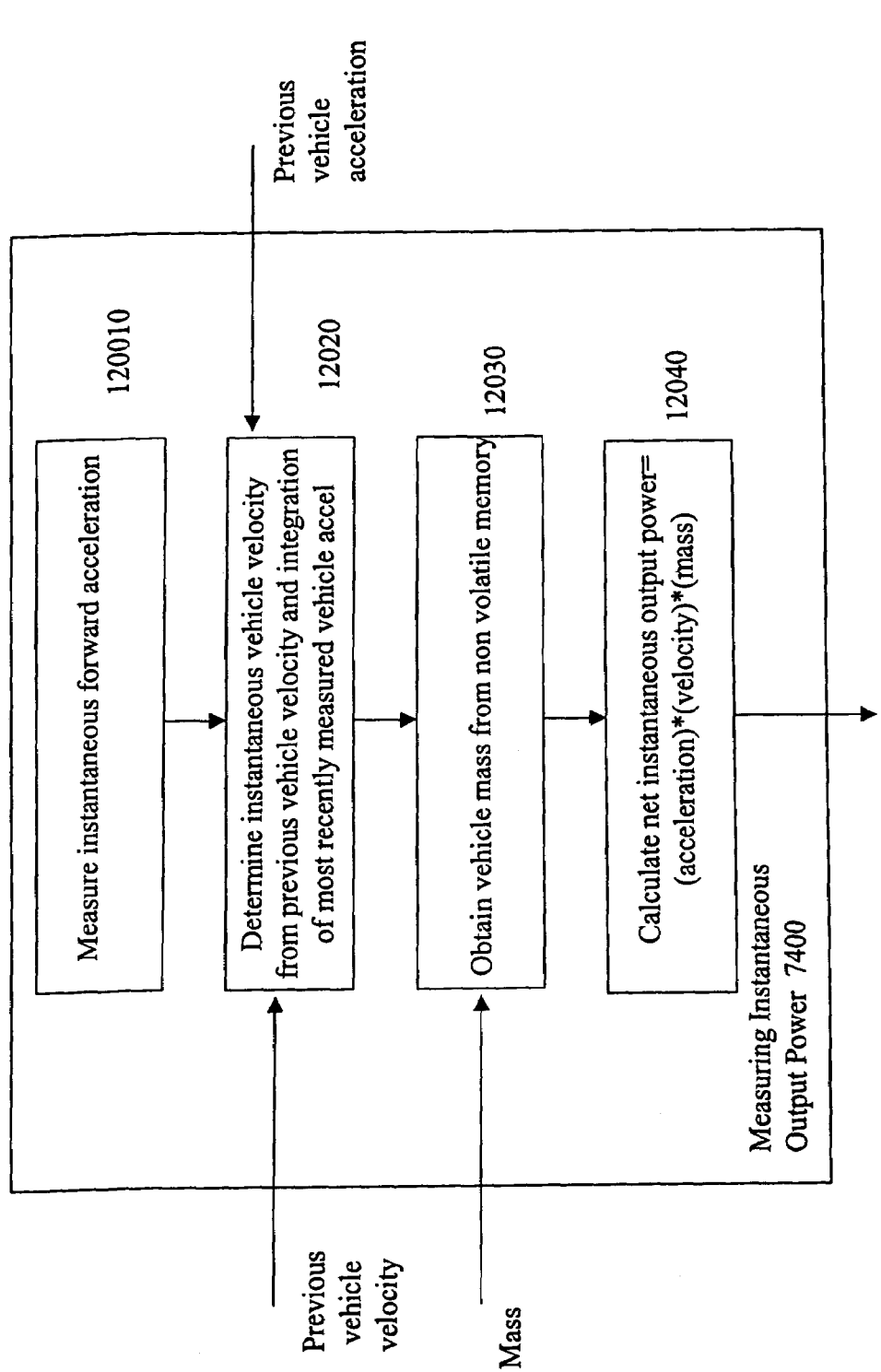
FIG. 12 is a process flow diagram of a preferred embodiment of a method of determining engine output power, and which is represented generally as step 7400 in FIG. 7.

FIG. 12 is a flowchart illustrating a method of determining engine output power (7400 of FIG. 7). The calculation uses equation (2) above. At block 120010, acceleration data of the vehicle is measured by methods known to those skilled in the art. At block 12020, velocity data of the vehicle is calculated from integration of the acceleration measurements, as known to those skilled in the art. At step 12030 the vehicle mass is recalled from non-volatile memory. At step 12040, output power can then be calculated based on velocity data, acceleration data, and mass of the vehicle, as known to those skilled in the art.

Figure 13:
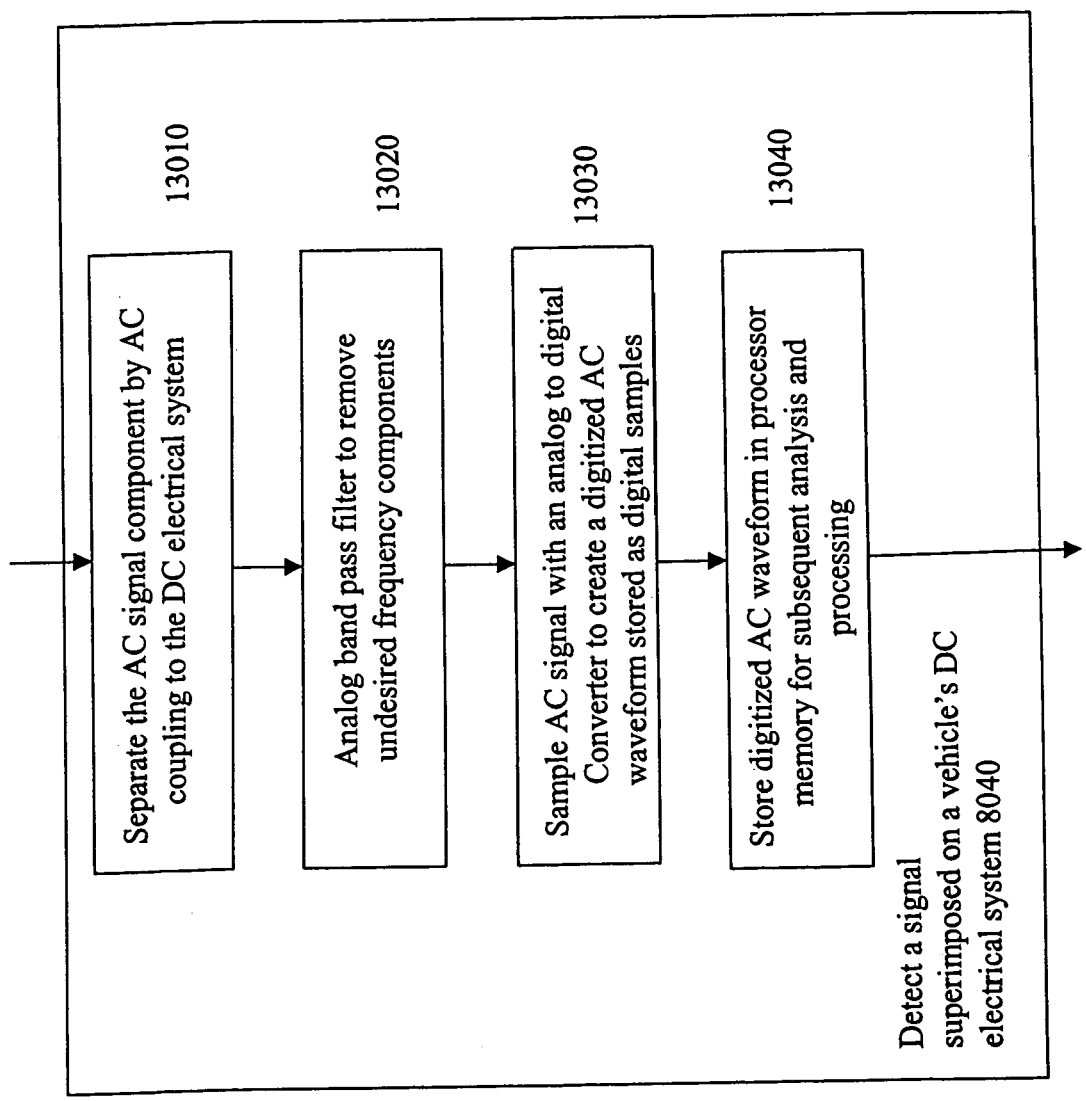
FIG. 13 is a process flow diagram of a preferred method of detecting a signal that has been superimposed on vehicle's D.C. electrical system.

FIG. 13 is a flowchart illustrating a preferred method for detecting an AC component or electrical engine noise signals that are superimposed on a vehicle DC power distribution system 8040 (of FIG. 8).

At step 13010, a signal indicative of the RPM level is measured while the vehicle engine is in rotary motion. In an exemplary embodiment, the predominately DC signal that is present in the cigarette lighter (and available-anywhere on a typical vehicle's power distribution lines) includes an AC component that provides a signal proportional to the vehicle's RPMs, which is input into the performance meter 1001. At step 13020, a filter is used to remove the interfering frequencies from the power bus. The filtering is typical as known to those skilled in the art.

At step 13030 the analog AC signal is converted to a digital form using an analog to digital conversion device. This operation is performed for some period of time, as is known to those skilled in the art.

After the time period has expired, the digitized data are stored in processor memory for subsequent analysis and processing at step 13040.

FIG. 14 shows one embodiment of the process of digitally processing the AC component of the DC Power bus signal 8050 (of FIG. 8). Processing of AC signals to generate a signal proportional to shaft angular velocity can be accomplished by digital signal processing (DSP) the AC electrical signals to generate a number proportional to the RPM level.

At step 14010 a series of digitized samples are retrieved from processor memory. At step 14020 the data are computationally processed, using a Fast Fourier Transform or equivalent spectral method to obtain the predominant frequencies and amplitudes of the AC electrical signal, and an analysis performed for continuous AC electrical noise.

Concurrently, at step 14025 the duration between leading edges of nearly singular spikes in the electrical noise are measured, and an analysis performed for 'spiky' electrical noise using methods known to those skilled in the art.

At step 14030 certain algorithms known to those skilled in the art are applied to the relevant information from either or both steps 14020 and or 14025.

At step 14040 the stored calibration data are combined with the relevant computed values from step 14030, using methods known to those skilled in the art. At step 14050 the current engine RPM is output.

FIG. 15 is a process flow diagram depicting a preferred method of generating a signal (shiftlight) to the operator indicating that the vehicle should be shifted as vehicle approaches the shift point, for a shift point which is based solely on a the engine RPM level reaching a fixed value. For the case where RPMs are increasing, at step 15010, a first signal is generated when the measured angular velocity is within a first predetermined value of the shift point. At step 15020, a second signal can also be generated when the measured angular velocity is within a second predetermined value of the shift point. At step 15030, a third signal is generated when the measured angular velocity reaches the shift point. For the case where RPMs are decreasing, at step 15035 the signal changes back to the second type. At step 15025 the signal changes back to the first type. At 15015 the signal is turned off. The trigger levels for the downward progression lie slightly lower than the levels for the upward progression.

The flow chart processes illustrated above may be implemented, for example, using electronic circuits and systems known to those skilled in the art. It will also be appreciated that the processes shown by the flow charts may be implemented in special purpose hardware such as discrete analog and/or digital circuitry, such as combinations of integrated circuits or one or more Application Specific Integrated Circuits (ASICS).

A computer program instruction which may be loaded onto a computer, or other programmable data processing apparatus, to produce a machine such that the instructions which execute on the computer or other programmable data processing apparatus to create means for implementing the functions specified in the blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions specified in the blocks.

Accordingly, the flow charts previously illustrated may be implemented by combined electronic circuits and other means for performing the specified functions. It will be understood that the circuits and other means supported by each block in the flow charts illustrated above, and combinations of these blocks, can be implemented by special purpose hardware, software or firmware operating on special (or general purpose) data processors, or combinations thereof.

Figure 16:
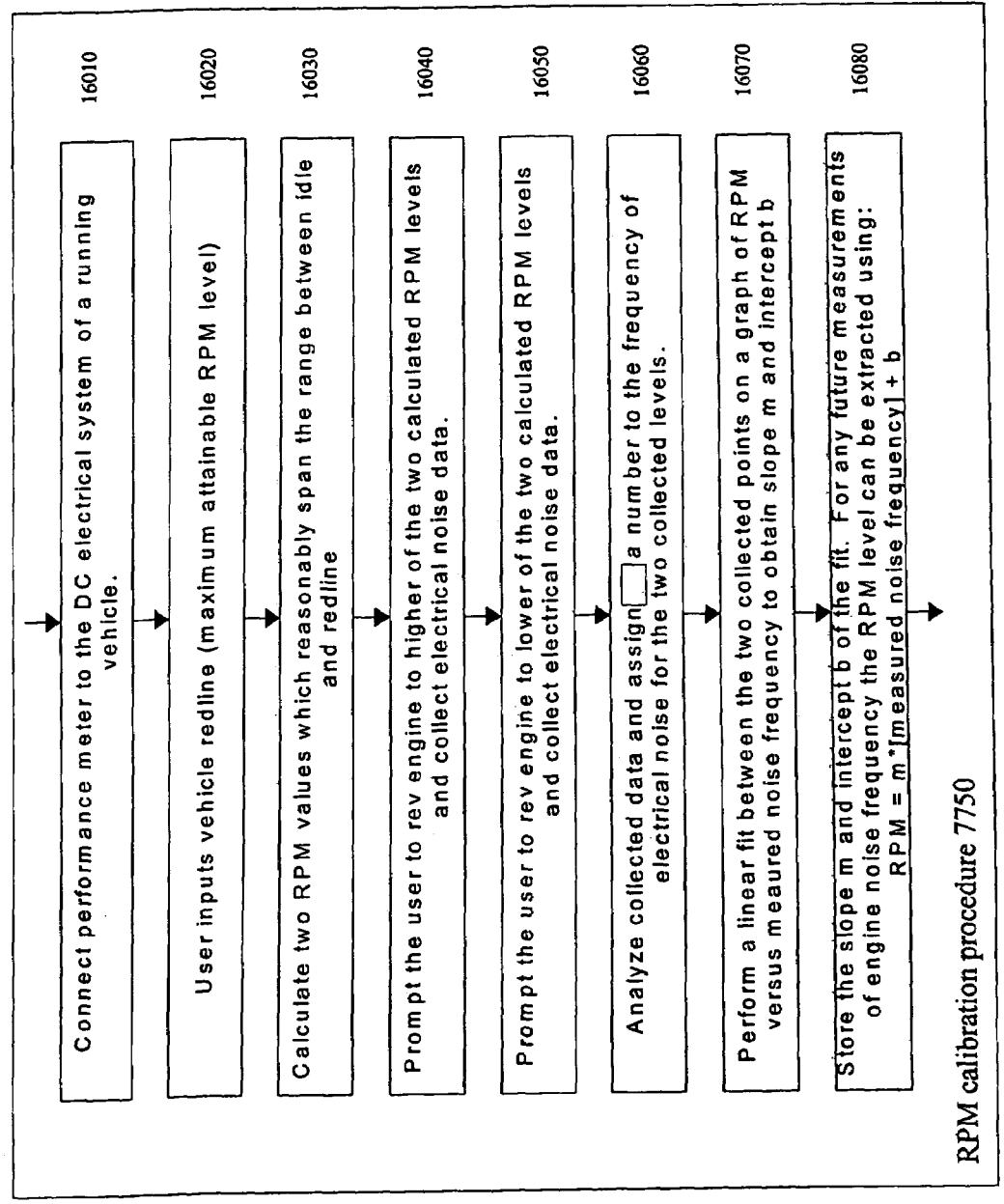
FIG. 16 is a process flow diagram of a preferred method of calibrating a performance meter such as the performance meter of FIG. 1.

FIG. 16 is a process flow diagram of the RPM calibration procedure 7750 (of FIG. 7). Regardless of how the RPM level is measured (alternator signals processed by Fourier Analysis, or Spike detection) the performance meter must be calibrated against the engine of the vehicle with which it is going to be used. Every make of engine may have a different ratio of pulley diameters, alternator windings, etc, and differing numbers of ignition spikes per engine revolution.

To calibrate the user is guided through a brief process. At step 16010, the user connects the performance meter to the DC electrical system of a running vehicle. The user is then instructed to enter the redline (maximum attainable RPM level) of the vehicle. From this value, two RPM values are determined which span the range of attainable RPMs.

Then the user is instructed at step 1640 to rev to the higher of the two levels-(using their dashboard tachometer as a reference) and asked to initiate the G-tech to measure the RPM signal. The engine noise is characterized and saved to memory. Then the same process is repeated for a lower RPM level at step 1650. Since the RPM signals are directly proportional to engine rotational speed, a linear interpolation of the two numbers leads to a translation between the measured signal and the engine RPM level for all RPM values.

At step 16060 the data collected is analyzed using methods known to those skilled in the art and a number is assigned to the frequency of electrical noise for the two collected levels. At step 16070 a linear fit is performed utilizing methods known to those skilled in the art, between the two collected points on a graph of RPM verses measured frequency to obtain slope "m" and y intercept "b". At step 16080 the slope and y intercept point of the fit are stored. In the future measurements of engine noise frequency can be used to determine RPMs by using:

$$RPM = m^*(\text{measured engine noise frequency}) + b \quad (4)$$

For vehicles which exhibit spikes due to ignition activity, it is possible to further refine the calibration by using the data collected in the previous steps and the number of spikes measured in a given period of time. Since all vehicles have an integer number of sparkplugs, it is often easy to determine the integer exact RPM level regardless of the accuracy of the actual vehicle tachometer.

For instance, a four cylinder engine fires two cylinders at a time. One sees two spikes per engine revolution. If the user is asked to rev to 4000 RPM, but the performance meter measures 8200 spikes per second, then the measured number of spikes can be divided by the target RPM level (8200/4000=2.1 for this example) and then round to the nearest integer to determine that there are two spikes per revolution (the INTEGER requirement) and adjust the calibration even when the user or their existing tachometer are inaccurate.

Figure 17:
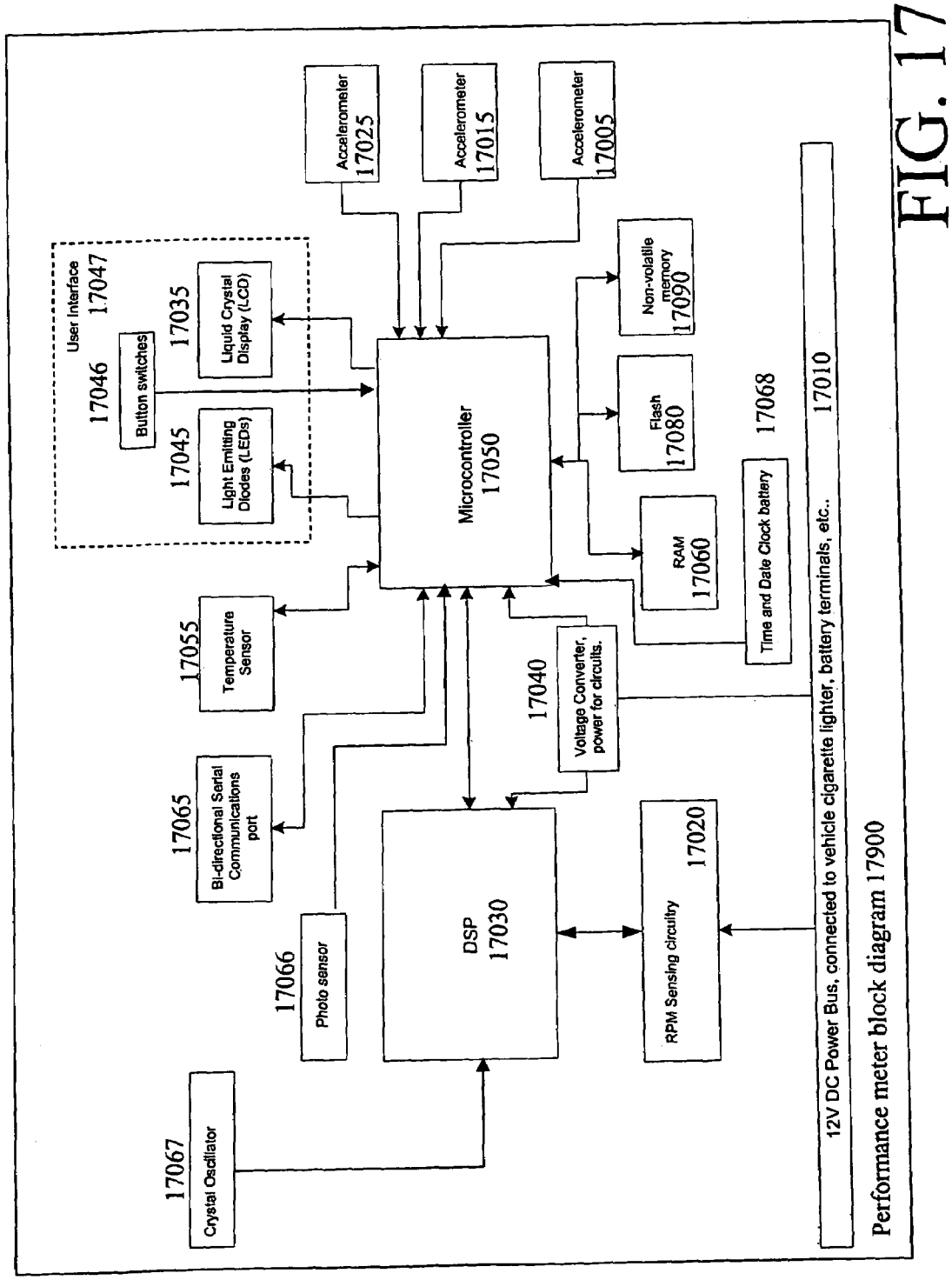
FIG. 17 is a block diagram of a preferred hardware configuration of the performance analyzer of FIG. 1.

FIG. 17 is a block diagram of an embodiment of the electronics 17900 disposed in the automotive performance meter 1001 (of FIG. 1) or "performance analyzer" for a vehicle having an engine with a motor shaft and a DC electrical system. The performance meter 17900 can include a microprocessor 17050, a battery for time and date while the performance meter is not plugged into an external power source 17068, an oscillator 17067, a temperature sensor for accelerometer temperature compensation 17055, a photo sensor for automatic LED brightness adjustment 17066, a FLASH nonvolatile memory 17080, and a RAM volatile memory 17060.

In addition an RPM sensing, filtering, and A/D converter circuit 17020 is coupled to a DSP chip 17030 for RPM signal processing via a serial data bus.

Also shown are a power supply circuit 17040, serial communications circuit 17065, individually addressable LEDs 17045 that function as, among other things, shift lights, and a LCD display 17035. The power supply circuit 17040 provides multiple power supplies for the accelerometers 17005, 17015, 17025, and IC chips including the microprocessor 17050 and the DSP chip 17030.

Integrated circuit accelerometer chips 17005, 17015, and 17025 are provided on individual daughter boards, that are inserted into attachment points of the main circuit board.

Before use an accelerometer such as the ADXL201E initial values of the offset and scale factor for the accelerometer sensors need calibration. The accelerometer sensor outputs a voltage or frequency value linearly proportional to the level of acceleration it is subjected to. For low g applications, the force of gravity is the most stable, accurate and convenient acceleration reference available. A reading of the 0 g point can be determined by orientating the device parallel to the earth's surface and then reading the output. A more accurate calibration method is to make measurements at +1 g and −1 g. The sensitivity can be determined by the two measurements. To calibrate, the accelerometer's measurement axis is pointed directly at the earth. The 1 g reading is saved and the sensor is turned 180° to measure −1 g. Using the two readings, the sensitivity is: Let A=Accelerometer output with axis oriented to +1 g Let B=Accelerometer output with axis oriented to −1 g then: Sensitivity=[A−B]/2 g. The process is repeated independently for the three independent axes of the performance meter.

Accelerometer sensors also drift with temperature. The variation of the output signal is usually linear, but not always. The process of calibrating the sensor against the earth's gravity is therefore repeated at least two temperatures. The offset and sensitivity calibration factors are stored for each temperature at which the calibration is performed. A curve is fit through the temperature dependent calibration coefficients. Each time acceleration is measured, sensor temperature is also measured. The sensitivity and offset calibration parameters are corrected for temperature effects and then applied to the raw acceleration measurement to result in a quantitative measurement of acceleration.

As shown, the performance analyzer receives an input signal that originates from the vehicle's electrical system 17010. The input signal powers the performance meter electronics 17900 and allows information about the RPM level of the engine shaft to be found, while the engine is running 17020. The RPM sensing circuitry 17020 includes a high pass (HPF) RC filter at its input, followed by a cascaded conventional low pass filter (LPF). The HPF may be replaced by a DC blocking capacitor, or an equivalent HPF constructed as known by those skilled in the art. The HPF and LPF cascade may be equivalently replaced by a band pass filter (BPF) having pass band cut off frequencies similar to the corner frequencies of the LPF and HPF cascade. The output from the filters is coupled to a conventional analog to digital converter (A to D), constructed with methods known to those skilled in the art. A digital signal is output from the A to D and coupled to the DSP (17030).

The performance meter 17900 preferably includes a microprocessor 17050 coupled to a DSP chip constructed with methods known to those skilled in the art, an RPM sensing circuit 17020 coupled to a DSP chip 17030 for RPM signal processing. Conventionally constructed accelerometer integrated circuit sensors 17005, 17015, and 17025 coupled to the microcontroller generate acceleration data when the vehicle is in motion.

The accelerometer sensors 17025, 17015, and 17005 (of FIG. 17) are typically a plurality of accelerometers contained in an accelerometer chip, which can be used to determine acceleration of the vehicle in the orthogonal directions and generates acceleration measurements in each. Equivalently, three separate accelerometers positioned orthogonally may be utilized. Equivalently, the sensors need not be placed orthogonally but placed in such a way that their basis vectors span three-dimensional space. The microprocessor 17050 determines the velocity of the vehicle by integrating the acceleration measurements with respect to time. The microprocessor 17050 then preferably uses the velocity data, acceleration data, and mass of the vehicle to determine output power using equation (2) discussed above.

A nonvolatile FLASH memory 17080 coupled to the microcontroller 17050 stores time, speed, distance, xyz acceleration, RPMs and calculated forward acceleration, and calibration data, and any other relevant information. RAM 17060 coupled to the microcontroller 17050 is used for real time operations in combination with the flash memory. A user interface 17047 coupled to the microcontroller 17050 includes individually addressable LEDs 17045, that can function as shift lights and other functions to alert the driver, an LCD display 17035, and buttons for data input 17046.

The microprocessor 17050 or central processing unit (CPU) or microcontroller such as an ARM 7 reduced instruction set (RISC) microprocessor or its equivalent, is responsive to many inputs, including acceleration data and signals that include information about the angular velocity of the motor shaft. The microprocessor 17050 calculates output power of the vehicle based on the acceleration data, velocity data (that can be determined by integrating the acceleration data), and the mass of the vehicle. Calculation is performed utilizing equation (2).

Once the microprocessor 17050 calculates the output power of the engine, the microprocessor preferably further determines an optimal shift point at which the output power begins to decrease. For example, the microprocessor 17050 can determine a shift point using information about the RPM level and output power information to anticipate the shift point.

The microprocessor 17050 generates a signal indicating that the vehicle should be shifted as the measured engine shaft angular velocity approaches a value near the designated shift point. The shift point varies depending on numerous factors and variables as will be discussed in greater detail below.

The RPM sensing circuit 17020 detects electrical signals superposed on voltages present in the vehicle's electrical system, and the microprocessor 17050 and the DSP 17030 analyze the electrical signals to generate a value proportional to the RPM level. The electrical signals comprise various types of electrical noise introduced by the engine. For example, the RPM analysis circuit 17020 measures the input signal. Then the DSP 17030, and the CPU 17050 determine the RPM level while the engine is running utilizing methods known to those skilled in the art. The microprocessor 17050 then determines a shift point using the RPM data and output power information.

RPM Determination

Most automotive DC electrical systems include battery terminals, and the performance analyzer can measure electrical signals through a cigarette lighter connected to the battery terminals. The RPM sensing circuit 17020 detects electrical signals that comprise low-level noise superposed on the electrical system by the alternator, sparkplugs, and other components. The processor can then analyze the electrical signals to generate a value that is proportional to the RPM level. Various types of electrical noise can be utilized to determine the RPM level, and examples of some types of such noise will now be described.

Spike-Type Noise

The electrical noise may comprise a plurality of spikes superposed on the automotive electrical system in a DC voltage signal from the vehicle's DC electrical system. The performance analyzer preferably utilizes this spike-type electrical noise that is generated due to the firing of spark plugs. In a many vehicles, the electrical system generates a spike each time a spark plug fires. The number of spikes per engine revolution is proportional to the number of times that cylinders fire per revolution. The number of spikes per fixed unit of time is directly proportional to the angular velocity of the motor shaft or RPM level. This noise can be measured through a cigarette lighter connected to the battery terminals if the automotive DC electrical system includes battery terminals, but could also be measured at other locations that allow for measurement of the electrical signals. One spike is generated each time a spark plug fires, and the number of spikes measured in a fixed amount of time is directly proportional to the RPM level of the vehicle.

In some embodiments, the RPM analysis circuit senses and filters the electrical noise that is detected in, for example, electrical signals measured through a cigarette lighter that is connected to the vehicle's battery terminals.

The RPM analysis algorithms 14025 (of FIG. 14) measures duration between leading edge of spikes and is capable of counting the number of spikes during a known period of time, which allows the microprocessor 17050 (of FIG. 17) generate a number proportional to the RPM level.

Continuous Noise

Many vehicles include a DC electrical system that generates a DC voltage, and an AC alternator/generator that is directly connected to the motor shaft such that the angular velocity of the AC alternator/generator is directly proportional to the RPM level. The AC alternator/generator also generates AC electrical signals based on the angular velocity of the AC alternator/generator. These AC electrical signals have a frequency that is directly related to the angular velocity of the AC alternator/generator. These AC electrical signals typically comprise a voltage (lower in peak to peak amplitude than the DC level of typically 12V) "ripple" signal that is superposed on the DC voltage of the vehicle's electrical system. The frequency of the AC voltage is directly related to the frequency of the ripple signal which comprises a rectified, substantially sinusoidal signal that is a remnant of the AC voltage. The performance analyzer may also utilize, for example, "continuous" electrical noise that includes the noise generated by the vehicle's alternator and other sources. For example, the performance analyzer 1001 can detect the AC electrical signals superposed on the DC voltage that is generated by the DC electrical system to obtain RPM information.

The RPM sensing and analysis components 17020, (of FIG. 17) may detect these AC electrical signals, and through appropriate sampling known to those skilled in the art, the digital signal processor or DSP chip 17030 and the Microcontroller 17050 can then analyze/process the AC electrical signals with the appropriate software algorithms to generate a value proportional to the RPM level of the engine.

For example, in alternative embodiments, the DSP chip 17030 (of FIG. 17) determines a frequency of the ripple signal by fast Fourier transforming, or equivalently utilizing other suitable mathematical processes, the superimposed DC voltage and ripple signal. The frequency of the ripple signal is then converted to the RPM level by the microcontroller 17050, or value using a proportionality constant that is set during a calibration procedure. For example, an embodiment may include a Texas Instruments DSP chip which is capable of taking real-time fast Fourier transforms of the AC coupled incoming 12VDC signal with ripple that appears in the vehicle electrical system. From these Fourier transforms the ripple frequency can be measured, and converted to engine RPMs with a proportionality constant obtained during a user calibration procedure.

Shift Point Determination

Once output power is known, the microprocessor 17050 can determine the shift point by anticipating an optimal shift point at which measured output power as a function of time has begun to decrease. By calibrating the unit and then letting it perform the calculation, the shift point may be set manually by the user or determined intelligently. Thus, shift points can be determined intelligently by using acceleration measurements to anticipate when output power is about to suddenly decrease. Intelligently determining the shift point can provide shift points that account for performance variations caused by aerodynamic drag, vehicle rolling frictions and drivetrain losses, as well as the user's modifications to the vehicle. Shift lights can also serve purposes other than indicating the optimum time to shift gears. The shift lights may also blink when the car reaches a particular distance, speed, RPM level, or engine output power.

User Interface and Shift Lights

The user interface 17047 preferably comprises a data entry device 17046, a display 17035 and LED indicator light sources 17045. Display 17035 can comprise an LCD display, an LED display, a vacuum fluorescent display or equivalent types of displays. The display may be configured to display current information of time, acceleration, velocity, output power (e.g., "horsepower"), RPM data, and so on. The information may be displayed in a wide variety of formats including graphs, charts, tables, etc.

For example, in an embodiment of the tachometer screen, the display 17035 includes the RPM data measured from periodic electrical signals, or engine noise, caused by various engine components. There are a variety of ways to provide RPM data, and two examples are described above.

In some embodiments, the user interface 17047 can include a plurality of shift lights implemented via individually addressable LEDs 17045. One of skill in the art will appreciate that the shift lights can be implemented, for example, using LEDs or other equivalent means. The shift lights preferably flash when the RPM needle approaches or reaches a shift point.

The microprocessor 17050 generates a first shift point signal when the measured angular velocity is within a first predetermined value of the shift point, and can optionally generate a second shift point signal when the measured angular velocity is within a second predetermined value of the shift point. A third signal is generated by the microprocessor 17050 when the measured angular velocity reaches the shift point. These signals are responsible for controlling individually addressable LEDs 17045 that function as shift lights and that are included on the user interface described below.

A number of predetermined light sequences can be set within a fixed number of RPMs of the shift point. For example, when the RPM needle gets within a first number of RPMs (e.g., 500 RPMs) of the shift point set on the tachometer, a first shift light could flash, and when the RPM needle gets within a second number of RPMs (e.g., 250 RPMs) of the shift point, a second shift light could flash either independently or in combination with the first shift light. When the RPM needle hits the shift point set on the tachometer, for example, a third shift light could flash either independently or in combination with the first shift light and the second shift light. These shift lights may be the same color or different colors. Any number of shift lights could be implemented at any number of predetermined values equal to any number of RPMs within the shift point.

Accordingly, in one embodiment, the microprocessor 17050 preferably can generates a signal when the measured angular velocity approaches the shift point, can optionally generate another signal when the measured angular velocity further approaches the shift point, and can generate another signal when the measured angular velocity reaches the shift point. The signals can comprise, for example, a visual and/or audible signal that is provided to an operator of the vehicle. This signal preferably originates within the interior of the vehicle without significantly distracting the driver. In some embodiments, these signals are responsible for controlling individually addressable LEDs 17045 that function as shift lights and that are included on the user interface described below.

FIG. 18 is a flow diagram of the process of generating an intelligent shift light based on a drop in power. Stored values of vehicle mass and accelerometer calibrations will be used for this real time process. The shift light is set to fire when the power output of the vehicle starts to decrease (the amount of drop being an adjustable threshold), after it has been determined to increase for some time. This will be referred to as the Power Drop Condition. The condition is reset when it is detected that the gearbox changes gears. At the start of the race the gear is assumed to be 1. A change is gear is determined by detecting a large drop in the measured RPM value over a short period of time, and/or a sudden drop in forward acceleration as the engine power is momentarily disconnected from the driveshaft during the gear shifting process. At this point the engaged gear is assumed to have increased by 1. Since the typical engine power versus RPM output curve first rises and then falls as engine redline is reached this will lead to a near optimal shift light indication. In the pure sense of the idea, no measurement of RPM is necessary. Only acceleration which is integrated to give speed (which then allows the calculation of power by $P=M*A*V$. In a broader sense, any other measurement of engine power (for example a strain gauge embedded in the drive shaft) could also serve as an input for this type of shift light.

Since not all vehicles have a Power curve which drops before hitting engine redline an alternate embodiment of this invention does take a real time RPM measurement into account. In this case the shift light may appear if either of two conditions are met: 1) The power Drop Condition as described above and 2) the current RPM level exceeds engine redline. Necessary requirements are a real time measure of engine power and a real-time measure of RPM. The method of RPM measurement is not limited to the techniques described in this document. Any conventional RPM measurement known to those skilled in the art is also acceptable.

FIG. 19 is a flow diagram showing a process of generating a real time shift light determined by gearing ratios, power and RPM measurements. This embodiment of the shift light requires a real time measurement of vehicle power and RPMs, and stored values of vehicle gearbox gear ratios, and a stored value of the currently engaged gear. During a typical drag race a driver will strive to generate maximum engine power causing the RPM value to increase steadily until redline is reached in first gear. After shifting into second gear, the RPM value will again increase steadily until redline, etc. During the first gear, the engine power and RPMs are stored real time. At all times the RPM level the engine would experience in the second gear is calculated by multiplying the current RPM value by the ratio of the gear ratios of first and second gear. The power at the current RPM level is continually compared to the power at the calculated RPM level for second gear (19060). When the current power level is smaller than or equal to the projected power level for second gear the driver is instructed to sift (19080). This process continues for any gears N and N+1.

For the case of engines which do not experience a drop in power after reaching a maximum, a more robust embodiment would employ a stored value of the engine redline (19010) and preemptively (19040) signal the driver to shift when engine redline is reached.

The Current embodiment measures power using accelerometer sensors and RPMs directly from the vehicle electrical system. Measuring one or both of these signals by alternate means known to those skilled in the art is also acceptable.

While aspects of the present invention have been described in terms of certain preferred embodiments, those of ordinary skill in the will appreciate that certain variations, extensions and modifications may be made without varying from the basic teachings of the present invention. As such, aspects of the present invention are not to be limited to the specific preferred embodiments described herein. Rather, the scope of the present invention is to be determined from the claims, which follow.

What is claimed is:

1. A method of instructing a driver of a vehicle to shift gears of the vehicle, the vehicle having a DC electrical system and the method comprising the steps of:
   (a) entering an RPM threshold value;
   (b) sensing a signal on the DC electrical system of the vehicle;
   (c) separating an AC component of the signal;
   (d) identifying a frequency value in the AC component of the signal;
   (e) converting the frequency value into an RPM value based on a predetermined relationship between frequency and engine RPM;
   (f) comparing the RPM value to the RPM threshold value; and
   (g) instructing the driver to shift gears if the RPM value exceeds a value based on RPM threshold value.

2. A system for instructing a driver of a vehicle to shift gears of the vehicle, the vehicle having a DC electrical system, the system for instructing the driver comprising:
   (a) a memory for storing an RPM threshold value;
   (b) an electrical tap for electrically connecting to the DC electrical system of the vehicle;
   (c) a high pass filter electrically connected to the tap for separating an AC component of the signal;
   (d) a processor electrically connected to the high pass filter for identifying a frequency value in the AC component of the signal, converting the frequency value into an RPM value based on a predetermined relationship between frequency and engine RPM, and comparing the RPM value to a value based on the RPM threshold value;
   (e) a user interface coupled to the memory for inputting the RPM threshold value and instructing the driver to shift gears if the RPM value exceeds a level based on the RPM threshold value.

3. The system of claim 2 wherein the tap connects to the electrical system via a electrical socket in a cab of the vehicle.

4. A method of instructing a driver of a vehicle to shift gears of the vehicle, the vehicle having a DC electrical system and the method comprising the steps of
   (a) repeatedly estimating a current instantaneous power propelling the vehicle;
   (b) storing the current instantaneous power if it is a maximum instantaneous power since a most recent shift in gears;
   (c) comparing a difference between the maximum instantaneous power and the current instantaneous power to a predetermined threshold; and
   (d) instructing the driver to shift gears if the difference exceeds a level based on the predetermined threshold.

5. The method of claim 4 further comprising steps of:
   entering an RPM threshold value;
   comparing a measured RPM value to the RPM threshold value; and
   instructing the driver to shift gears if the RPM value exceeds a level based on the RPM threshold value.

6. A system for instructing a driver of a vehicle to shift gears of the vehicle, the vehicle having a DC electrical system, the system for instructing the driver comprising:
   (a) an accelerometer for determining acceleration of the vehicle;
   (b) a memory for storing a value for the mass of the vehicle;
   (c) a processor electrically connected to the accelerometer and the memory for estimating a current instantaneous power propelling the vehicle using the value for the mass and the acceleration, determining if the current instantaneous power is a maximum instantaneous power since a most recent shift in gears; comparing a difference between the maximum instantaneous power and the current instantaneous power to a level based on a predetermined threshold; and
   (d) a user interface coupled to the memory for entering the value for the mass of the vehicle and instructing the driver to shift gears if the processor determines that the difference exceeds the level based on the predetermined threshold.

7. The system of claim 6, the processor comparing a measured RPM value to an RPM threshold value; and the user interface instructing the driver to shift gears if the RPM value exceeds a level based on the RPM threshold value.

8. A method of instructing a driver of a vehicle to shift gears of the vehicle, the vehicle having a DC electrical system, and the method comprising the steps of:
   (a) providing gear ratios for the vehicle;
   (b) providing an engaged gear of operation;
   (c) repeatedly estimating a current instantaneous power propelling the vehicle for the engaged gear;
   (d) calculating a projected power output value at a matching RPM for the next higher gear;
   (e) comparing a difference between the current instantaneous power and the projected power output value; and
   (f) instructing the driver to shift to the next higher gear if the difference exceeds a level based on a predetermined threshold.

9. The method of claim 8 further comprising steps of:
entering an RPM threshold value;
comparing a measured RPM value to the RPM threshold value; and
instructing the driver to shift to the next higher gear if the RPM value exceeds a level based on the RPM threshold value.

10. A system for instructing a driver of a vehicle to shift gears of the vehicle, the vehicle having a DC electrical system, the system for instructing the driver comprising:
   (a) a memory for storing gear ratios and an engaged gear of operation;
   (b) a processor electrically connected to the memory for estimating a current instantaneous power propelling the vehicle for the engaged gear, calculating a projected power output value at a matching RPM for a next higher gear, and comparing a difference between the current instantaneous power and the projected power output value; and
   (c) a user interface coupled to the processor for instructing the driver to shift to the next higher gear if the difference exceeds a level based on a predetermined threshold.

11. The system of claim 10, the processor comparing a measured RPM value to an a RPM threshold value; and the user interface instructing the driver to shift gears if the RPM value exceeds a level based on the RPM threshold value.

* * * * *